United States Patent
Lee et al.

(10) Patent No.: US 11,656,999 B2
(45) Date of Patent: May 23, 2023

(54) ELECTRONIC DEVICE AND METHOD FOR DETERMINING AND MANAGING A PARTIAL REGION OF MAPPING INFORMATION IN VOLATILE MEMORY

(71) Applicant: SAMSUNG ELECTRONICS CO., LTD., Suwon-si (KR)

(72) Inventors: Manjong Lee, Suwon-si (KR); Hyeongjun Kim, Suwon-si (KR); Changheun Lee, Suwon-si (KR); Jintae Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/896,524

(22) Filed: Jun. 9, 2020

(65) Prior Publication Data
US 2020/0394139 A1 Dec. 17, 2020

(30) Foreign Application Priority Data

Jun. 17, 2019 (KR) .................. 10-2019-0071473

(51) Int. Cl.
*G06F 12/10* (2016.01)

(52) U.S. Cl.
CPC ........ *G06F 12/10* (2013.01); *G06F 2212/657* (2013.01)

(58) Field of Classification Search
CPC ............. G06F 12/10; G06F 2212/7201; G06F 12/0246

(Continued)

(56) References Cited

U.S. PATENT DOCUMENTS 7,502,782 B2 * 3/2009 Sedlar .................. G06F 16/188
7,549,035 B1 * 6/2009 Cameron ............ G06F 12/1045
711/207

(Continued)

FOREIGN PATENT DOCUMENTS

JP 2013-33337 A 2/2013
JP 2019-49876 A 3/2019

(Continued)

OTHER PUBLICATIONS

International Search Report dated Aug. 14, 2020 in corresponding International Application No. PCT/KR2020/006848.

(Continued)

*Primary Examiner* — Gautam Sain
*Assistant Examiner* — Edward Waddy, Jr.
(74) *Attorney, Agent, or Firm* — Nixon & Vanderhye P.C.

(57) ABSTRACT

An electronic device may include a processor, a first volatile memory, and a storage including a nonvolatile memory and a second volatile memory. The processor may be configured to: identify information of a specific file and a kind of a request for data included in the specific file in response to a creation of the request for the data, set a flag in the request based on the identified information of the specific file, identify whether mapping information of a specific region including a logical address of the data among mapping information in which logical addresses and physical addresses for the nonvolatile memory are mapped onto each other is stored in the first volatile memory, determine whether to manage the mapping information of the specific region using the first volatile memory, and determine whether to update the mapping information of the specific region in the first volatile memory.

14 Claims, 15 Drawing Sheets

(58) Field of Classification Search
USPC ......................................................... 711/206
See application file for complete search history.

(56) References Cited

U.S. PATENT DOCUMENTS

| | | | | |
|---|---|---|---|---|
| 9,263,082 | B2* | 2/2016 | Hetzler | .................. G11B 15/68 |
| 9,600,184 | B2* | 3/2017 | Flynn | ..................... G06F 3/0643 |
| 2010/0217951 | A1* | 8/2010 | Pan | ........................ G06F 12/10 |
| | | | | 711/E12.059 |
| 2010/0250834 | A1 | 9/2010 | Trika et al. | |
| 2012/0140561 | A1* | 6/2012 | Fukuda | ............... G06F 12/0246 |
| | | | | 365/185.18 |
| 2013/0185488 | A1* | 7/2013 | Talagala | .............. G06F 12/0246 |
| | | | | 711/103 |
| 2014/0337560 | A1 | 11/2014 | Chun et al. | |
| 2016/0246726 | A1 | 8/2016 | Hahn | |
| 2017/0068621 | A1 | 3/2017 | Watanabe et al. | |
| 2017/0192902 | A1 | 7/2017 | Hwang et al. | |
| 2018/0039578 | A1 | 2/2018 | Yun et al. | |
| 2019/0004944 | A1 | 1/2019 | Widder et al. | |
| 2019/0042460 | A1 | 2/2019 | Trika et al. | |
| 2019/0121570 | A1 | 4/2019 | Kim et al. | |
| 2019/0138220 | A1 | 5/2019 | Hahn et al. | |
| 2019/0317892 | A1* | 10/2019 | Lee | ........................ G06F 3/0679 |
| 2019/0317894 | A1* | 10/2019 | Frolikov | ............. G06F 12/0246 |

FOREIGN PATENT DOCUMENTS

| | | |
|---|---|---|
| WO | WO 2014/186232 | 11/2014 |
| WO | 2017/209813 | 12/2017 |

OTHER PUBLICATIONS

European Search Report and Written Opinion dated Nov. 16, 2020 in corresponding European Patent Application No. 20179525.9.

* cited by examiner

ELECTRONIC DEVICE AND METHOD FOR DETERMINING AND MANAGING A PARTIAL REGION OF MAPPING INFORMATION IN VOLATILE MEMORY

CROSS-REFERENCE TO RELATED APPLICATION

This application is based on and claims priority under 35 U.S.C. § 119 to Korean Patent Application No. 10-2019-0071473, filed on Jun. 17, 2019, in the Korean Intellectual Property Office, the disclosure of which is incorporated by reference herein in its entirety.

BACKGROUND

Field

The disclosure relates to an electronic device including a storage and a method for using the storage.

Description of Related Art

A portable terminal may use a separate storage in order to store a large amount of data. A flash memory is a device including a nonvolatile memory, and has been widely used in a portable terminal, a computer, a digital camera, and a memory card.

In the case where the flash memory performs a garbage collection function in order to minimize a garbage region, data may be moved. Accordingly, the flash memory may use mapping information (logical to physical map table (L2P table)) in which logical addresses and physical addresses are mapped onto each other for a storage space in which data is stored.

In order to raise a processing speed for a request for data, a host device may load mapping information, stored in a nonvolatile memory of a storage, into a volatile memory of the host device to use the loaded mapping information. The host device may perform logical to physical (L2P) address conversion using the mapping information loaded into the volatile memory. The volatile memory of the host device is restricted in size, and only a partial region of the mapping information may be loaded thereinto and used.

According to a method for loading and using a partial region of mapping information in a volatile memory of a host device, the partial region of the mapping information to be loaded into the volatile memory of the host device is determined based on the internal policy of the storage, and thus the mapping information of the region including data desired by a user may not be directly used.

According to the method for loading and using the partial region of the mapping information in the volatile memory of the host device, the time when the mapping information is loaded into the volatile memory of the host device is determined based on the internal policy of the storage, and thus overhead may occur when the mapping information is loaded into the volatile memory of the host device.

SUMMARY

Embodiments of the disclosure provide an electronic device that determines and manages a partial region of the mapping information to be loaded into the volatile memory of the host device.

Embodiments of the disclosure further provide an electronic device that determines the time when the processor loads the mapping information into the volatile memory of the host device.

An electronic device according to various example embodiments of the disclosure may include a processor, a first volatile memory, and a storage including a nonvolatile memory and a second volatile memory. The processor according to various example embodiments may be configured to: identify information of a specific file and a kind of a request for data included in the specific file in response to a creation of the request for the data, determine whether to set a flag in the request based on the identified information of the specific file, identify whether mapping information of a specific region including a logical address of the data among mapping information in which logical addresses and physical addresses for the nonvolatile memory are mapped onto each other is stored in the first volatile memory, determine whether to manage the mapping information of the specific region using the first volatile memory based on the identified kind of the request and whether the flag is set in the request, and determine whether to update the mapping information of the specific region in the first volatile memory based on the identified kind of the request and a result of identifying whether the mapping information is stored.

A method for using a storage of an electronic device including the storage according to various example embodiments of the disclosure may include: identifying information of a specific file and a kind of a request for data included in the specific file in response to a creation of the request for the data, determining whether to set a flag in the request based on the identified information of the specific file, identifying whether mapping information of a specific region including a logical address of the data among mapping information in which logical addresses and physical addresses for a nonvolatile memory included in the storage are mapped onto each other is stored in a first volatile memory, determining whether to manage the mapping information of the specific region using the first volatile memory based on the identified kind of the request and whether the flag is set in the request, and determining whether to update the mapping information of the specific region in the first volatile memory based on the identified kind of the request and a result of identifying whether the mapping information is stored.

An electronic device according to various example embodiments of the disclosure may include a processor, a first volatile memory, and a storage including a nonvolatile memory and a second volatile memory. The processor according to various embodiments may be configured to: identify whether mapping information of a specific region including a logical address of data among mapping information in which logical addresses and physical addresses for the nonvolatile memory are mapped onto each other is stored in the first volatile memory in response to a creation of a request for the data included in a file, transmit the request for the data to the storage, and transmit a request to read the mapping information of the specific region to the storage in response the mapping information of the specific region not being stored in the first volatile memory.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
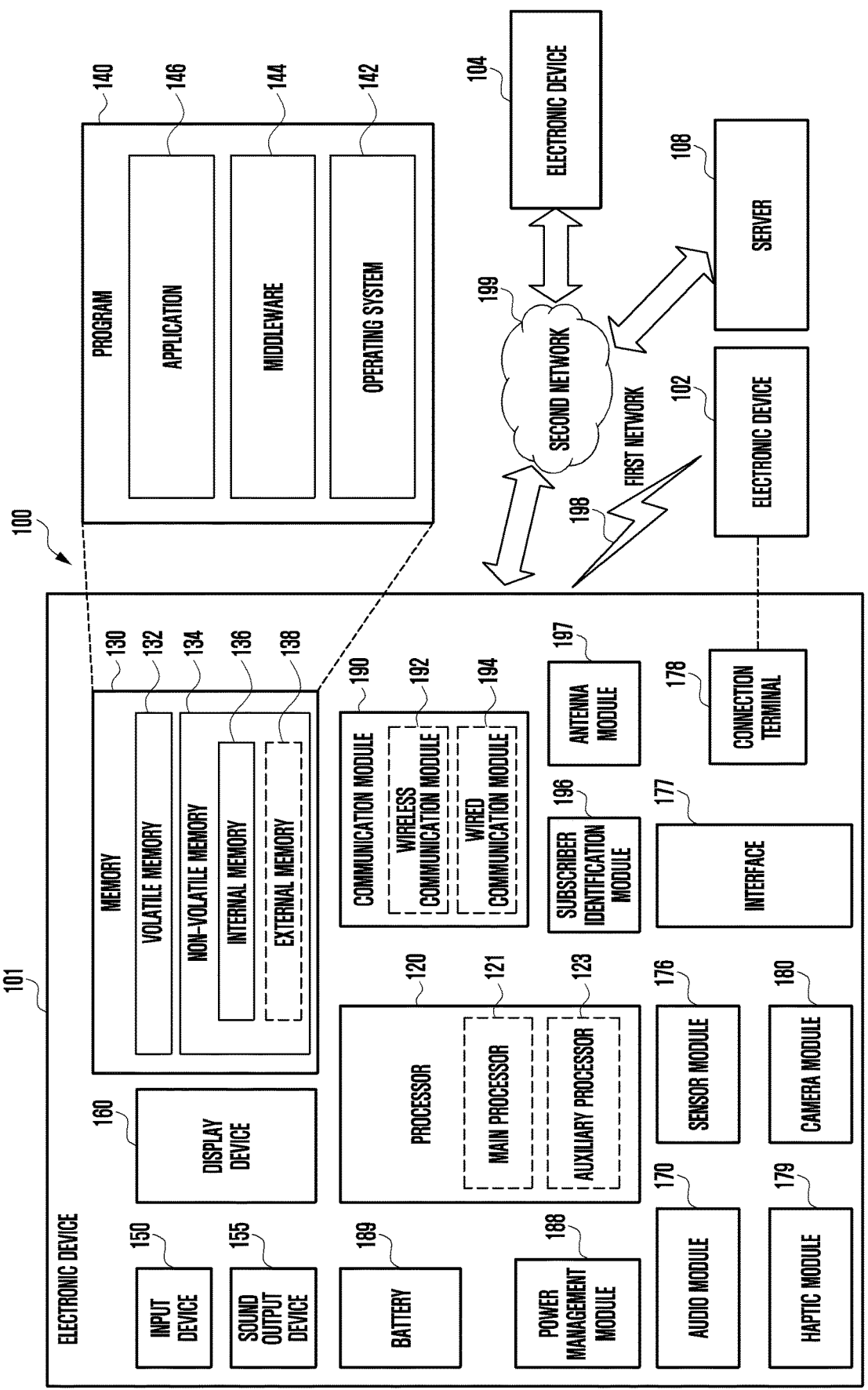
FIG. 1 is a block diagram illustrating an example electronic device in a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108.

According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
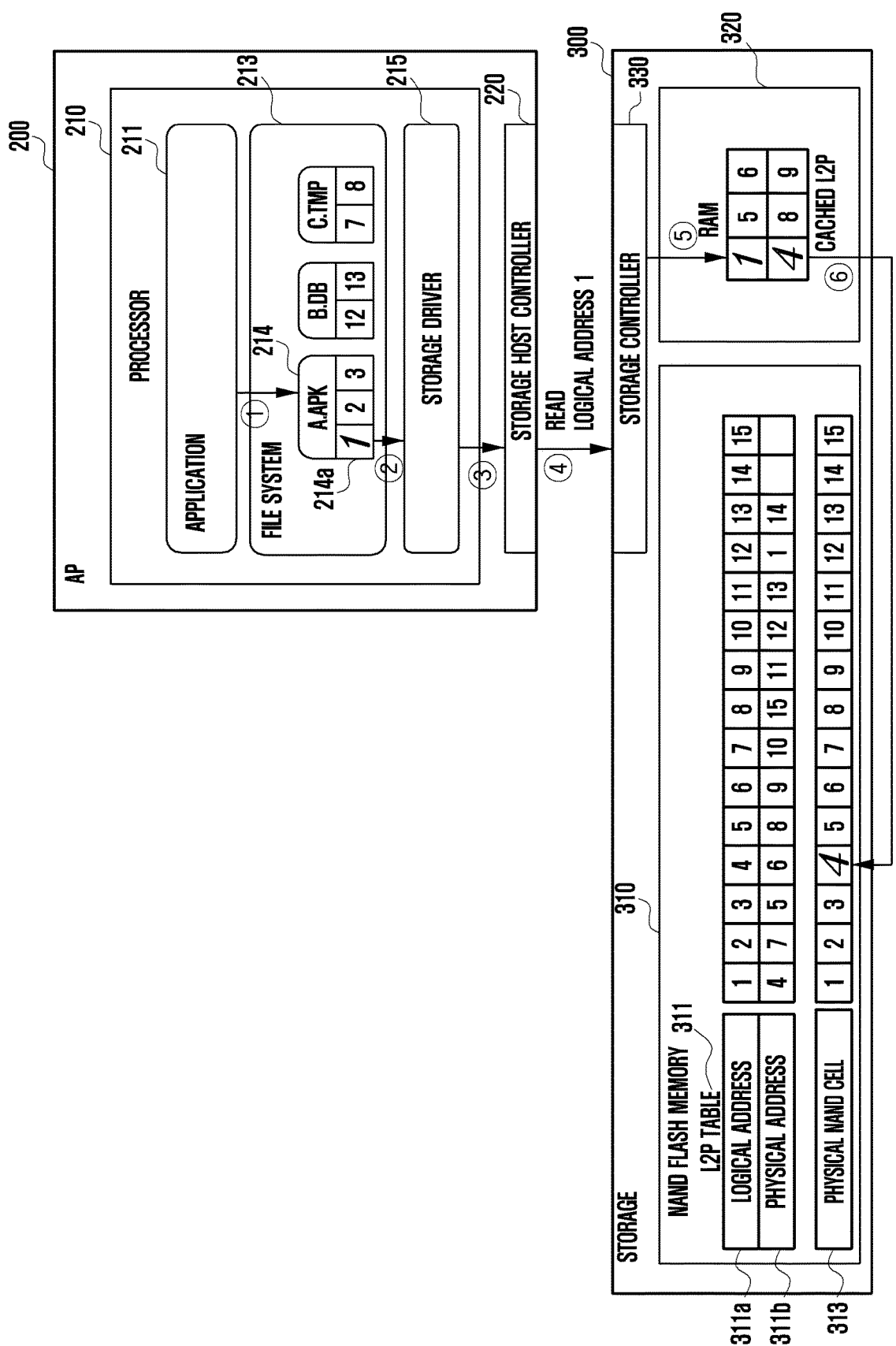
FIG. 2A is a block diagram of an electronic device illustrating an example process in which a request to read data is processed according to various embodiments of the disclosure.
Figure 2B:
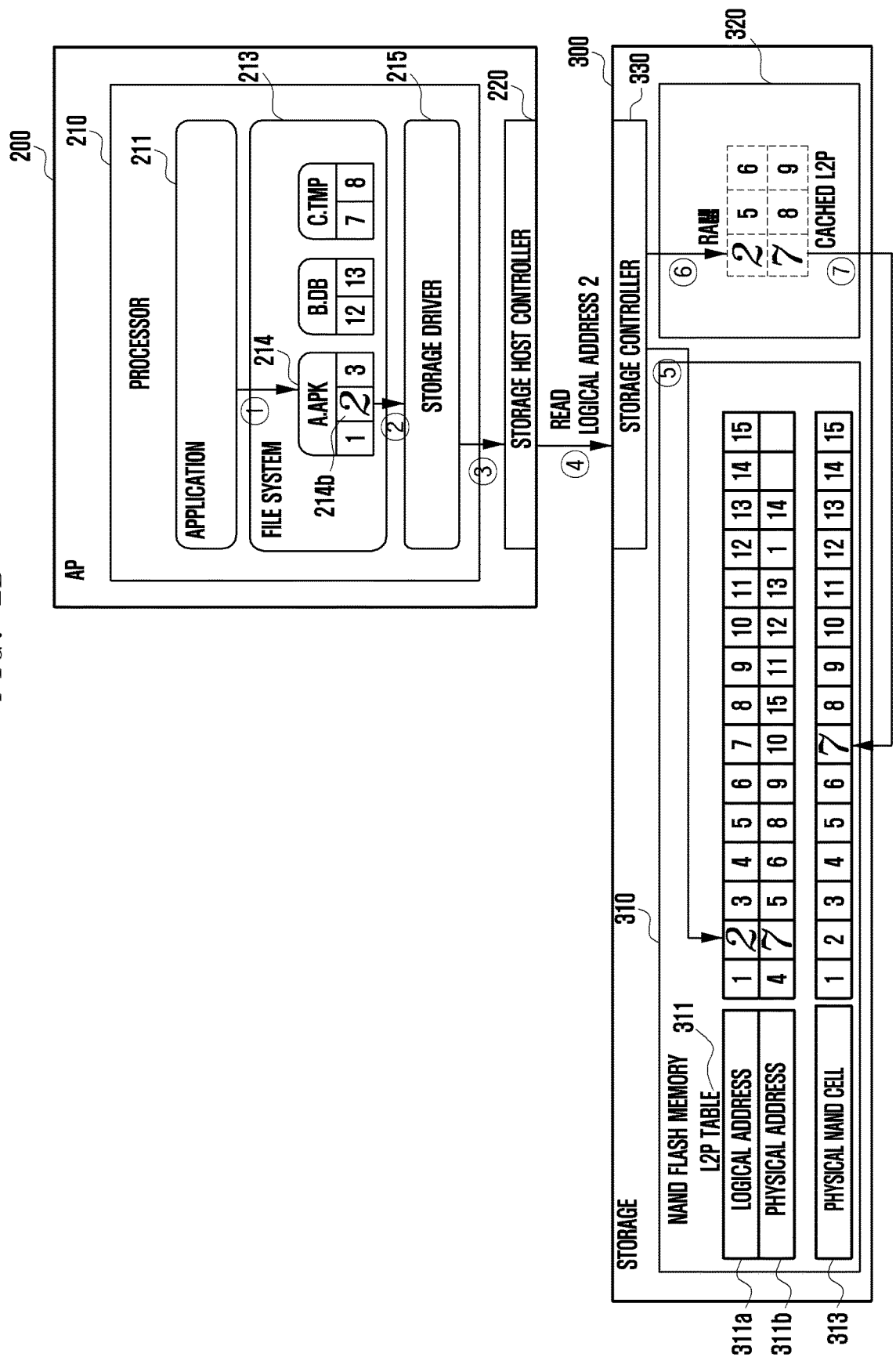
FIG. 2B is a block diagram of an electronic device illustrating an example process in which a request to read data is processed according to various embodiments of the disclosure.

FIGS. 2A and 2B are block diagrams of an electronic device illustrating an example process in which a request to read data is processed according to various embodiments of the disclosure.

FIG. 2A is a diagram illustrating an example process in which an electronic device (e.g., electronic device 101 of FIG. 1) processes a request to read data if mapping information corresponding to the data is loaded into a RAM 320 (or volatile memory) of a storage 300 when the request to read the data is created in the electronic device according to various embodiments.

With reference to FIG. 2A, the electronic device (e.g., electronic device 101 of FIG. 1) according to various embodiments may include an application processor (AP) 200 and a storage 300.

The application processor 200 according to various embodiments may include a processor (e.g., including processing circuitry) 210 (e.g., processor 120 of FIG. 1) and a storage host controller (e.g., including circuitry) 220.

The processor 210 according to various embodiments may include various processing circuitry and execute various pieces of software (e.g., programs 140). The processor 210 may execute, for example, an application 211, a file system 213, or a storage driver 215.

The storage 300 according to various embodiments may store various pieces of data being used by at least one element of the electronic device. The storage 300 according to various embodiments may include, for example, a NAND flash memory (e.g., nonvolatile memory) 310, a RAM (e.g., volatile memory) 320, and a storage controller (e.g., including circuitry) 330. The nonvolatile memory may be, for example, a flash memory. The nonvolatile memory may include, for example, a NAND flash memory that satisfies the universal flash storage (UFS) standard specification. The NAND flash memory 310 according to various embodiments may store mapping information 311 (e.g., mapping table) indicating the relationship (e.g., mapping relationship) between logical addresses 311a and physical addresses 311b for the stored data. The mapping information may be, for example, the mapping information 311 (logical to physical address mapping information (e.g., L2P table) in which the logical addresses 311a and the physical addresses 311b for the NAND flash memory 310 are mapped onto each other. The volatile memory of the storage 300 may be, for example, a RAM. The RAM 320 according to various embodiments may store (e.g., cache), for example, mapping information (e.g., cached L2P) of a partial region among the mapping information 311 stored in the NAND flash memory 310. The storage controller 330 according to various embodiments may include various controlling circuitry and be configured to control respective elements of the storage 300 and/or to perform an operation or data processing related to communications.

According to various embodiments, a request to read data included in a specific file (data read I/O request or read I/O) may be created through the application 211. In order to process the request to read the data, the processor 210, at operation ①, may identify the logical address of the data, included in the corresponding specific file, through the file system 213. For example, if a request to read data 214a included in an A.apk file 214 is created, the processor 210 may identify through the file system 213 that the logical address of the corresponding data 214a is "1".

At operations ② and ③, the processor 210 according to various embodiments may transmit the request to read the data including the logical address of the data to the storage host controller 220 by executing the storage driver 215.

At operation ④, the storage host controller 220 according to various embodiments may transmit the request to read the data including the logical address of the data to the storage 300. According to an embodiment, the storage host controller 220 may transmit the request to read the data to the storage 300 based on the control of the processor 210.

At operation ⑤, the storage 300 according to various embodiments may identify whether address information corresponding to the data is included in the mapping information of the partial region stored (e.g., cached) in the RAM (e.g., volatile memory) 320 of the storage 300, based on the control of the storage controller 330. For example, the RAM 320 of the storage 300 may store the partial region of the mapping information (e.g., L2P table) 311 stored in the NAND flash memory (e.g., nonvolatile memory) 310. For example, the RAM 320 of the storage 300 may store and use only a part of the mapping information (e.g., L2P table) 311, stored in the NAND flash memory 310, due to the limitations in size. In the case of processing the request for the data using the mapping information (e.g., cached L2P table) of the partial region stored in the RAM 320 of the storage 300, it is not necessary for the electronic device (e.g., application processor 200) to newly load the mapping information 311 stored in the NAND flash memory 310, and thus the processing speed may be improved.

According to various embodiments, if the address information corresponding to the data is included in the mapping information of the partial region stored in the RAM 320 of the storage 300, the storage controller 330 may identify the physical address, matching the logical address of the data, from the mapping information of the partial region stored in the RAM 320. For example, the storage controller 330 may identify from the mapping information of the partial region stored in the RAM 320 that the physical address matching a logical address "1" of the data is "4".

At operation ⑥, the storage controller 330 according to various embodiments may process the request to read the data by accessing the physical address of the data identified in a physical NAND cell 313.

FIG. 2B is a diagram illustrating an example process in which an electronic device (e.g., electronic device 101 of FIG. 1) processes a request to read data if mapping information corresponding to the data is not loaded into a RAM 320 of a storage 300 when the request to read the data is created in the electronic device according to various embodiments. Hereinafter, the contents overlapping the contents previously described with reference to FIG. 2A may not be repeated here with reference to FIG. 2B.

According to various embodiments, a request to read data included in a specific file (e.g., data read I/O request or read I/O) may be created through an application 211. In order to process the created request to read the data, the processor 210, at operation ①, may identify the logical address of the data, included in the corresponding specific file, through a file system 213. For example, if a request to read data 214b included in an A.apk file 214 is created, the processor 210 may identify through the file system 213 that the logical address of the corresponding data 214b is "2".

At operations ② and ③, the processor 210 according to various embodiments may transmit the request to read the data including the logical address of the data to a storage host controller 220 by executing a storage driver 215.

At operation ④, the storage host controller 220 according to various embodiments may transmit the request to read the data including the logical address of the data to the storage 300. According to an embodiment, the storage host controller 220 may transmit the request to read the data to the storage 300 based on the control of the processor 210.

The storage 300 according to various embodiments may identify whether address information corresponding to the data is included in the mapping information of a partial region stored (e.g., cached) in the RAM (e.g., volatile memory) 320 of the storage 300, under the control of the storage controller 330. The mapping information of the partial region indicated by dotted lines in the RAM 320 of the storage 300 may be mapping information which has not yet been loaded from a NAND flash memory 310 and thus has not yet been stored in the RAM 320, and thus it may refer, for example, to mapping information to be loaded from the NAND flash memory 310 later. If the address information corresponding to the data is not included in the mapping information of the partial region stored in the RAM 320 of the storage 300, the storage controller 330, at operation ⑤, may load the mapping information of the partial region including a logical address "2" of the data from the NAND flash memory 310 into the RAM 320 of the storage 300.

At operation ⑥, the storage controller 330 according to various embodiments may load the mapping information of the partial region corresponding to the logical address "2" of the data from the NAND flash memory 310 into the RAM 320 to store the loaded mapping information in the RAM 320. The mapping information of the partial region indicated by dotted lines in the RAM 320 of the storage 300 may refer, for example, to mapping information to be able to be used after being loaded from the NAND flash memory 310.

The storage controller 330 according to various embodiments may identify the physical address, matching the logical address of the data, through the mapping information (e.g., cached L2P) of the partial region newly loaded into the RAM 320. For example, the storage controller 330 may identify physical address "7", matching the logical address "2" of the data, through the mapping information of the partial region newly loaded into the RAM 320.

At operation ⑦, the storage controller 330 according to various embodiments may process the request to read the data by accessing the physical address of the data identified by a physical NAND cell 313.

Figure 3:
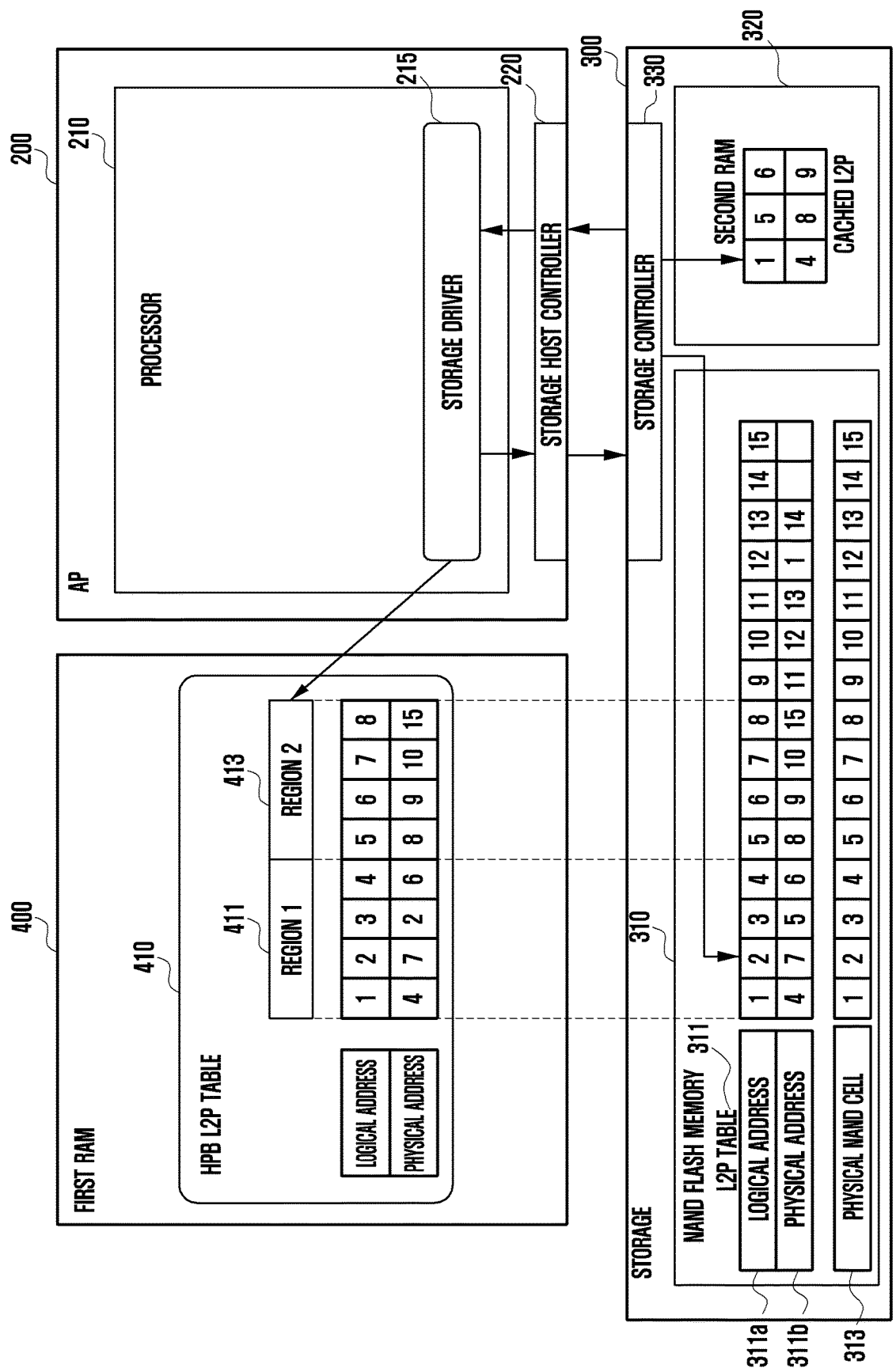
FIG. 3 is a block diagram of an electronic device illustrating an example host performance booster (HPB) function according to various embodiments of the disclosure.

FIG. 3 is a block diagram of an electronic device illustrating an example host performance booster (HPB) function according to various embodiments of the disclosure.

With reference to FIG. 3, the electronic device (e.g., electronic device 101 of FIG. 1) according to various embodiments may include an application processor 200, a first RAM (e.g., first volatile memory) 400, and a storage 300. According to various embodiments, the first RAM 400 may, for example, be a RAM of a host end being managed by a processor 210.

The storage 300 according to various embodiments may include, for example, a NAND flash memory (e.g., nonvolatile memory) 310, a second RAM (e.g., second volatile memory) 320, and a storage controller 330. The nonvolatile memory may be, for example, a flash memory. The nonvolatile memory may include, for example, a NAND flash memory 310 that satisfies the universal flash storage (UFS) standard specification. The NAND flash memory 310 according to various embodiments may store mapping information 311 indicating the relationship between logical addresses 311a and physical addresses 311b for the stored data. The mapping information 311 may be, for example, mapping information (logical to physical address mapping information (e.g., L2P table)) in which the logical addresses and the physical addresses for the NAND flash memory 310 are mapped onto each other.

The first RAM (first volatile memory) 400 according to various embodiments may load and store a partial region of the mapping information from the NAND flash memory (e.g., nonvolatile memory) 310 of the storage 300. The processor 210 according to various embodiments may process a request to read data using a mapping table (e.g., HPB L2P table) 410 of the partial region stored in the first RAM 400. For example, if a request to read data corresponding to a logical address "2" is created, the processor 210 may identify whether address information corresponding to the logical address "2" of the data is included in the mapping table 410 of the partial region stored in the first RAM 400. The information corresponding to the logical address "2" is included in mapping information 411 of a region "1" in the mapping table 410 currently stored in the first RAM 400, and thus the processor 210 may identify that the physical address corresponding to the logical address "2" of the data is "7". The processor 210 may include the physical address in the request to read the data to be transferred to the storage 300. An operation, in which the first RAM 400 of the host end is loaded with a part of the mapping information 311 in which the logical addresses 311a and the physical addresses 311b for the NAND flash memory 310 of the storage 300 are mapped onto each other and the processor 210 of the host end performs logical/physical address conversion, may be, for example, a host performance booster (HPB) function defined in the UFS standard. Using the HPB function, the processor 210 of the host end may perform the operation of loading the mapping information of the partial region being performed in the storage 300 into the second RAM 320 of the storage 300 and the operation (operation ⑥ of FIG. 2B) of converting the logical address into the physical address using the mapping information (e.g., cached L2P) of the partial region loaded into the second RAM 320 of the storage 300, and thus the processing performance for the data request can be improved.

According to various embodiments, the mapping table (e.g., HPB L2P table or HPB L2P mapping table) being loaded into the first RAM 400 may be loaded and managed in the unit of a predetermined size (e.g., 16 MB, 32 MB, or 64 MB). The unit may be referred to as a region. For example, mapping information including logical addresses "1, 2, 3, and 4" may be the mapping information 411 of the first region (e.g., region "1"), and mapping information including logical addresses "5, 6, 7, and 8" may be the mapping information 413 of a second region (e.g., region "2"). The HPB L2P mapping table 410 according to various embodiments may include metadata to identify integrity of the mapping information.

According to various embodiments, the processor 210 may load the mapping information of the partial region, among the mapping information, from the NAND flash memory 310 of the storage 300 into the first RAM 400. The detailed processing operation in accordance with the creation of the request for the data using the HPB function will be described in greater detail below.

Figure 4:
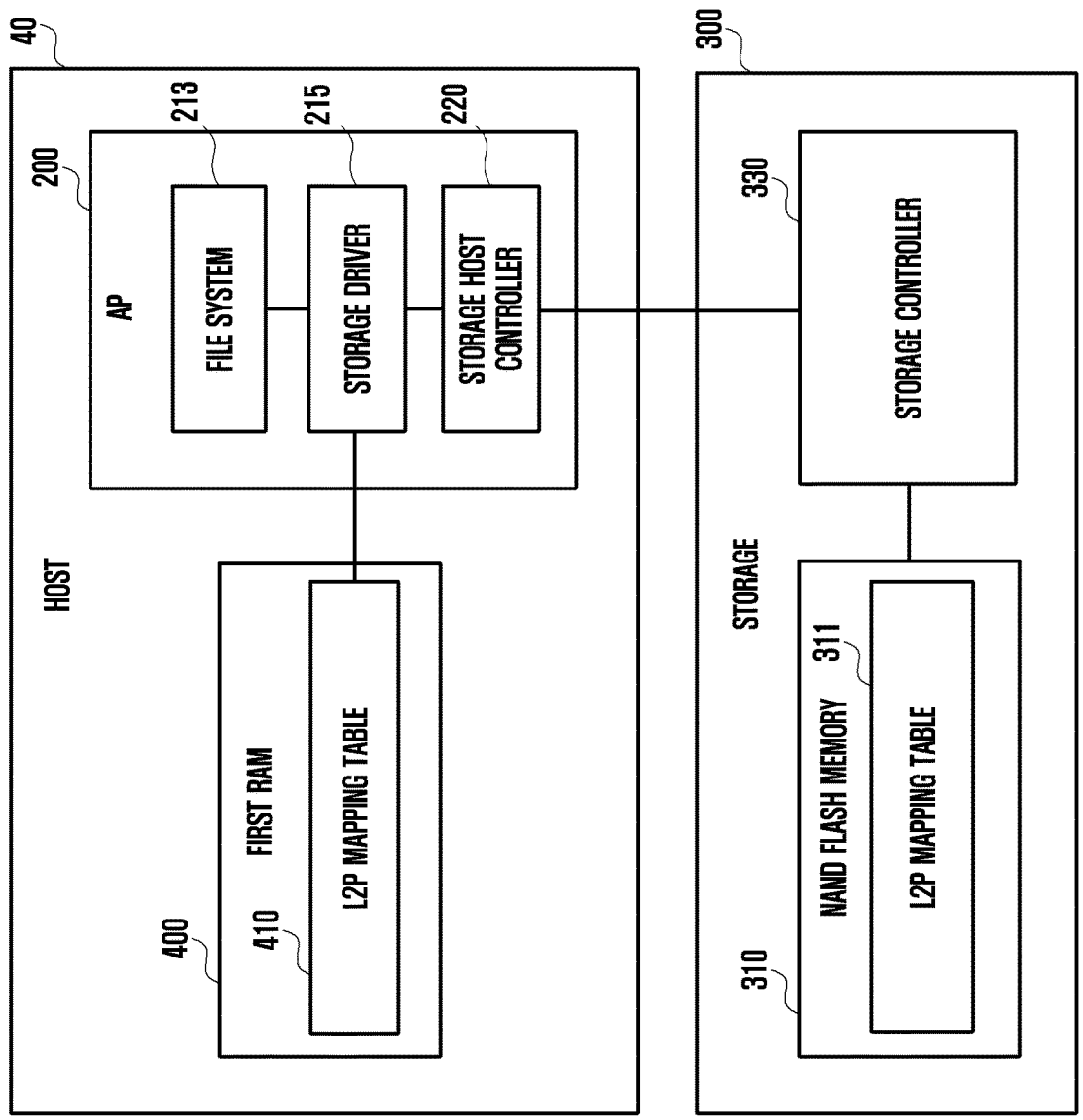
FIG. 4 is a block diagram illustrating an example electronic device according to various embodiments of the disclosure.

FIG. 4 is a block diagram illustrating an example electronic device according to various embodiments of the disclosure. FIG. 4 is a block diagram illustrating software and hardware layers of an electronic device according to various embodiments.

With reference to FIG. 4, an electronic device (e.g., electronic device 101 of FIG. 1) according to various embodiments may be divided into a host (e.g., host device) 40 and a storage 300. The host 40 according to various embodiments may be an environment in which software including a user application and the operating system (OS) operates. The host 40 according to various embodiments may include a first RAM 400 and an application processor (e.g., including processing circuitry) 200. The first RAM 400 may be, for example, a volatile memory, and it may store an HPB L2P mapping table 410 that may include mapping information of a partial region loaded from a NAND flash memory 310 of the storage 300. The host 40 may transfer, for example, various requests for data (data I/O requests), created during the software operation, to the storage 300.

The application processor 200 according to various embodiments may include various processing circuitry and be a hardware device for executing software loaded into the first RAM 400, and it may perform a software module operation. The application processor 200 according to various embodiments may include a file system 213, a storage driver 215, and a storage host controller 220. The file system 213 and the storage driver 215 may be software being executed in a processor (not illustrated) (e.g., processor 120 of FIG. 1 or processor 210 of FIG. 2). According to various embodiments, the processor may be configured to control respective elements of the electronic device and/or to perform an operation or data processing related to communications. For example, the processor may be operatively connected to the elements of the electronic device. The processor may load commands or data, received from other elements of the electronic device, into a memory, process the commands or data stored in the memory, and store resultant data.

The file system 213 according to various embodiments may be a software module for managing files stored in the storage 300, and it may support read/write/delete requests for data of basic files and manage attributes and authorities of files. If a request for data included in a specific file is created, the file system 213 according to various embodiments may determine whether to maintain/manage the L2P mapping table 410 stored in the first RAM 400 of the host 40 end, in order to identify the extension, attribute, or authority of the specific file. If it is determined that the first RAM 400 manages the L2P mapping table stored in the first RAM 400, the file system 213 may set a flag (HOST HPB flag) in the request for the data included in the corresponding file.

The storage driver 215 according to various embodiments may be a software module for communications with the storage 300, and it may manage the L2P mapping table 410 stored in the first RAM 400 of the host 40 end using the HPB function. For example, the storage driver 215 may manage the L2P mapping table 410, stored in the first RAM 400, based on whether to set the flag in the request for the data transferred through the file system 213 and the kind of the request for the data.

The storage host controller 220 according to various embodiments may include various circuitry and be a hardware module that takes charge of communications between the application processor 200 of the host and the storage 300.

The first RAM 400 according to various embodiments may be a volatile memory that is used in the application processor 200, and it may temporarily store driving software and data required for the software operation. If the storage 300 supports the HPB function, the L2P mapping table 410 that is the mapping information of a partial region loaded from the NAND flash memory 310 of the storage 300 may be stored in the first RAM 400.

The L2P mapping table 410 according to various embodiments may be a part of L2P mapping information 311 loaded from the storage 300 into the first RAM 400 of the host 40, and it may be used during processing of the request to read the data stored in the storage 300 and may be maintained and managed by the storage driver 215. According to various embodiments, the L2P mapping table 410 stored in the first RAM 400 may include a reference flag and an update (need-update) flag. The reference flag may be, for example, flag information indicating whether the mapping information of the corresponding region is managed by the host 40 (e.g., whether the mapping information is managed by the first RAM 400). For example, if the reference flag value of the mapping information of the specific region is set to "1", it may refer, for example, to the mapping information of the specific region being managed by the host 40, whereas if the reference flag value of the mapping information of the specific region is set to "0", it may refer, for example, to the mapping information of the specific region not being managed by the host 40. The update flag may be, for example, flag information indicating whether it is necessary to update the mapping information of the specific region stored in the first RAM 400 of the host 40 end. For example, if the update flag value of the mapping information of the specific region is set to "1", it may refer, for example, to it being necessary to update the mapping information of the specific region from the NAND flash memory 310, whereas if the update flag value is set to "0", it may refer, for example, to it not being necessary to update the mapping information of the specific region. According to various embodiments, the reference flag and the update flag may be set for each region of the L2P mapping table 410.

According to various embodiments, the storage 300 may include the NAND flash memory 310, a storage controller 330, and a second RAM 320 (not illustrated in FIG. 4).

The NAND flash memory 310 according to various embodiments may be a nonvolatile memory, and it may be a space in which data is physically stored. According to various embodiments, the L2P mapping information 311 (e.g., mapping table) may be stored in the NAND flash memory 310.

The L2P mapping information 311 in the NAND flash memory 310 according to various embodiments may include, for example, entire mapping information in which logical addresses and physical addresses for the NAND flash memory 310 are mapped onto each other. A part of the L2P mapping information 311 in the NAND flash memory 310 may be loaded into the second RAM 320 of the storage 300 to be used. If the storage 300 supports the HPB function, the part of the L2P mapping information 311 in the NAND flash memory 310 may be loaded into the first RAM 400 of the host 40 end to be used.

The storage controller 330 according to various embodiments may be a hardware module including various circuitry that takes charge of communications between the application processor 200 of the host 40 and the storage 300. For example, the storage controller 330 may process the request for the data being transferred from the host 40 and may manage the L2P mapping information 311 in the NAND flash memory 310.

Figure 5:
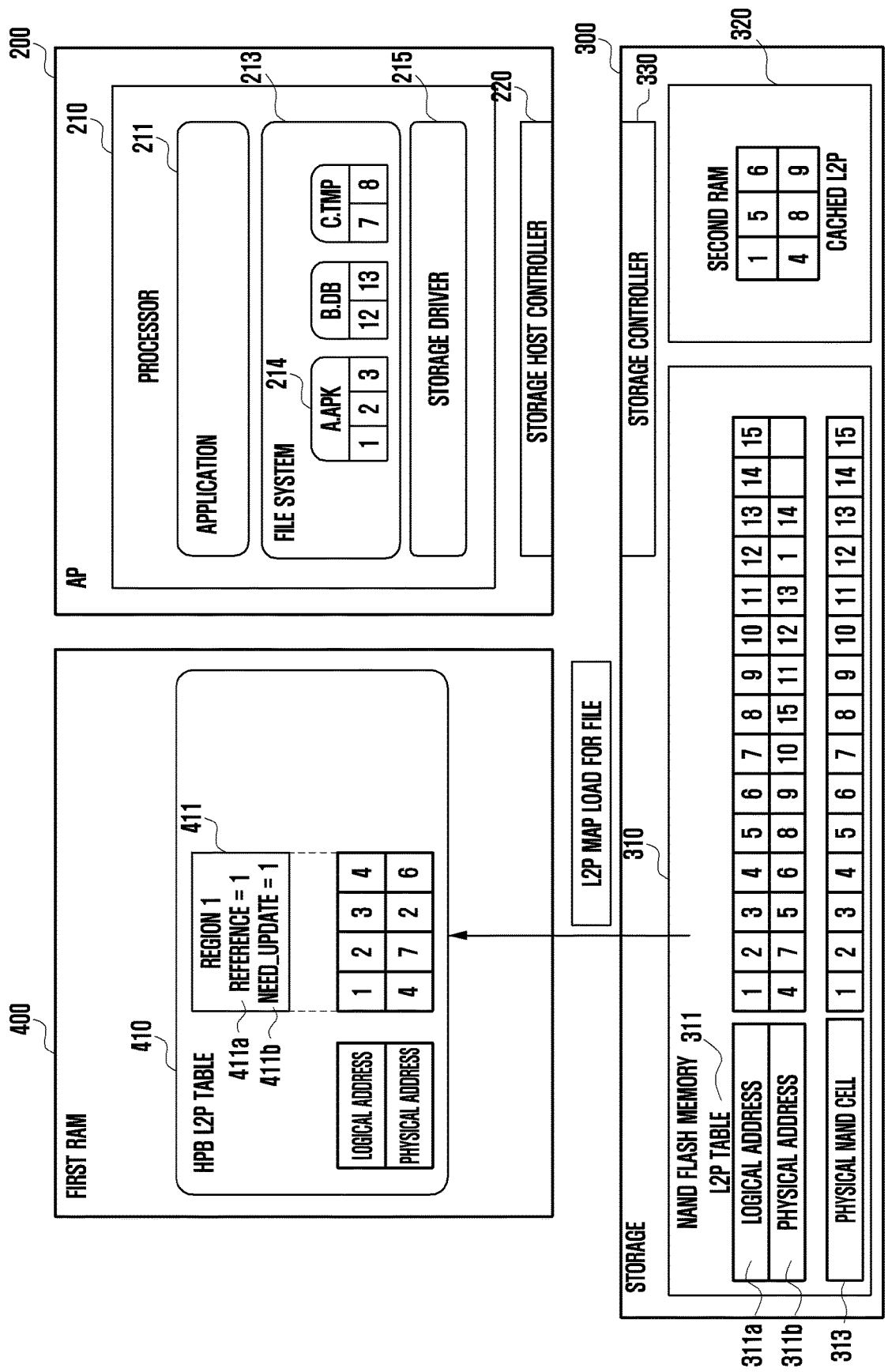
FIG. 5 is a block diagram of an electronic device illustrating an example of the electronic device performing an HPB function according to various embodiments of the disclosure.

FIG. 5 is a block diagram of an electronic device illustrating the electronic device performing an HPB function according to various embodiments of the disclosure.

With reference to FIG. 5, an electronic device (e.g., electronic device 101 of FIG. 1) according to various embodiments may include an application processor 200, a first RAM (first volatile memory) 400, and a storage 300. The description of the contents overlapping the contents described above may not be repeated here.

If the storage 300 supports the HPB function, a processor 210 according to various embodiments may include various processing circuitry and load mapping information (e.g., HPB L2P table) of a specific region from the storage 300 into the first RAM 400, and the processor 210 may manage a mapping table 410 of the specific region stored in the first RAM 400. For example, the processor 210 may process a request to read data using the mapping table 410 of the specific region stored in the first RAM 400.

The processor 210 according to various embodiments may set a flag in a request for data, and it may manage the mapping table (e.g., HPB L2P mapping table) 410, stored in the first RAM 400, based on whether the flag is set in the request for the data and the kind of the request for the data.

With reference to the first RAM 400 illustrated in FIG. 5, mapping information 411 corresponding to a first region (e.g., region 1) of the HPB L2P mapping table 410 stored in the first RAM 400 may be loaded. If a reference flag 411a of the mapping information 411 of the first region is set to "1" (reference=1), the mapping information 411 of the first region is determined to be managed by a host 40 end, and thus the mapping information 411 may be stored in the first RAM 400. If an update flag 411b of the mapping information 411 of the first region is set to "1" (need_update=1), the mapping information 411 of the first region may be required to be updated.

The processor 210 according to various embodiments may transmit a request to update the mapping information 411 of the first region, of which the update flag 411b is set to "1", to the storage 300. The processor 210 according to various embodiments may receive the mapping information of the specific region from the storage 300, and it may update the mapping information in the first RAM 400.

If a request for data included in a specific file is created, the processor 210 according to various embodiments may determine whether the specific file is a file to be used to execute a specific application, by, for example, identifying an extension and attribute information of the specific file through a file system 213. For example, if the extension of the specific file is apk, vdex, so, sc, or lib, the processor 210 may determine that the specific file is the file being used to execute the specific application. For example, if the file attribute of the specific file is an executable file, the processor 210 may determine that the specific file is the file being used to execute the specific application. The processor 210 according to various embodiments may determine whether it is suitable to manage the mapping information of the specific region corresponding to the data by means of the first RAM 400 of the host 40 end, by identifying whether the specific file is a read-only file. For example, if the file attribute of the specific file is the read-only file, the processor 210 may determine that it is suitable to manage the mapping information of the specific region corresponding to the data by means of the first RAM 400 of the host 40 end.

If it is determined that the specific file is a file to be used to enter the specific application, the processor 210 according to various embodiments may set the flag in the request for the data, and it may determine that the mapping information of the specific region including the physical address of the data is managed by the first RAM 400 of the host 40 end.

In order to smoothly perform the HPB function through the method disclosed above, the processor 210 may determine and manage the specific region, which is to be managed by the first RAM 400, in the mapping information (L2P mapping table) 311.

Although the above-disclosed method has been described with reference to an example in which the request for the data is created during the execution of (entry into) the specific application, it will be apparent that the method can also be applied, in addition to the above case, even in the case of improving the performance to process a request for data of files having a high access frequency or files having recently been accessed. Hereinafter, for convenience in explanation, explanation will be made mainly on the case of processing a request for data created during the execution of the application.

Figure 6:
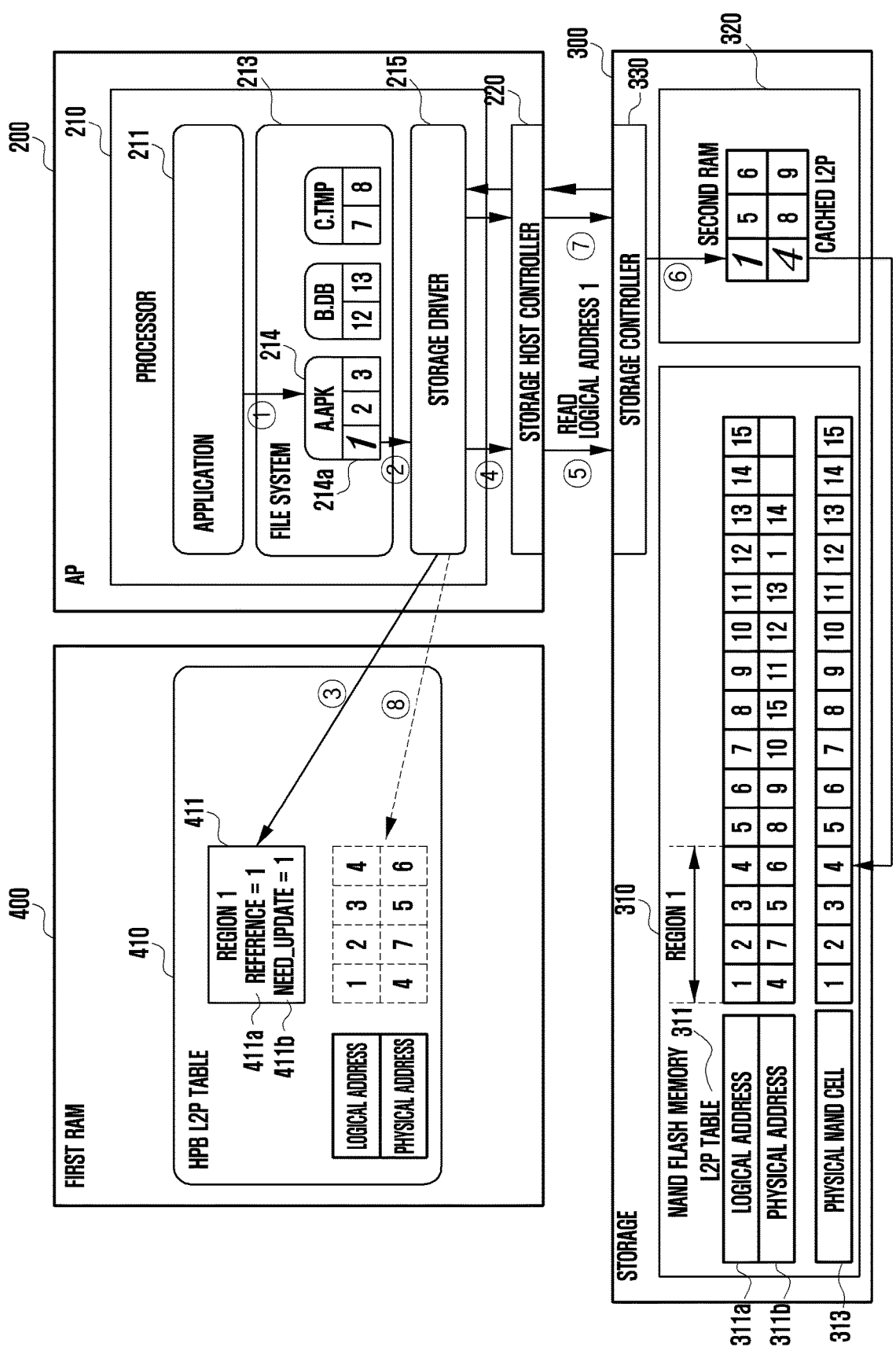
FIG. 6 is a block diagram of an electronic device illustrating an example process in which the electronic device processes a request to read data according to various embodiments of the disclosure.
Figure 7:
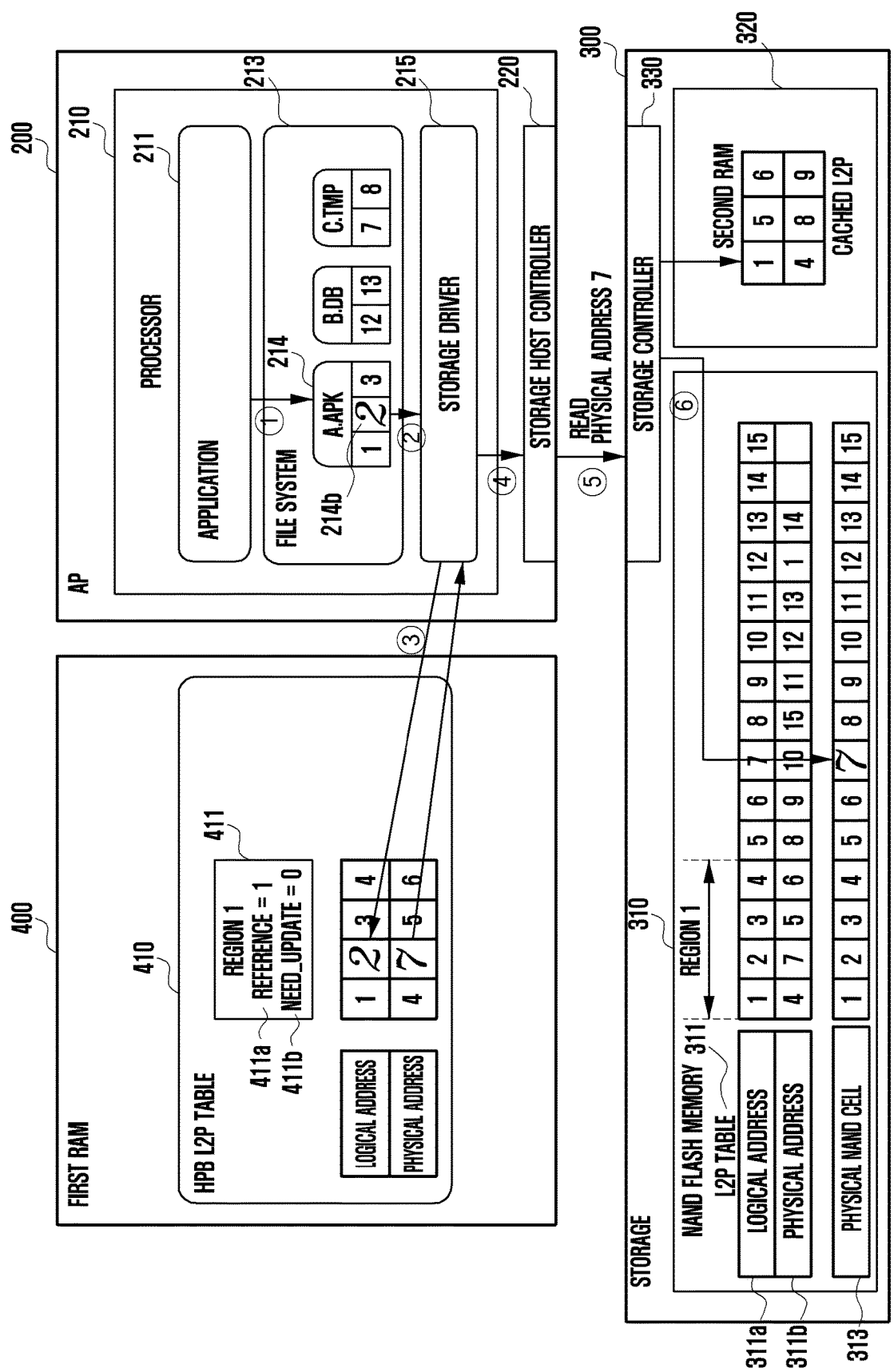
FIG. 7 is a block diagram of an electronic device illustrating an example process in which the electronic device processes a request to read data according to various embodiments of the disclosure.

FIGS. 6 and 7 are block diagrams of an electronic device illustrating an example process in which the electronic device processes a request to read data according to various embodiments of the disclosure.

FIG. 6 is a diagram illustrating an example process in which the electronic device processes a request to read data if mapping information of a specific region corresponding to the data does not exist in a first RAM 400 of a host 40 end when the request to read the data is created according to various embodiments.

With reference to FIG. 6, a processor 210 according to various embodiments, at operation ①, may identify a creation of a request to read data included in a specific file (e.g., data read I/O request) during an execution of an application. The processor 210 according to various embodiments may identify the kind of the created request for the data (e.g., read/write/delete request). The processor 210 according to various embodiments may identify, through a file system 213, a logical address of the data of the specific file of which the request to read the data is created. For example, the processor 210 may identify the creation of the request to read data 214a corresponding to a logical address "1" among data included in an A.apk file 214.

At operation ②, the processor 210 according to various embodiments may identify, through the file system 213, information of the specific file 214 of which the request to read the data is created. For example, the processor 210 may identify an extension and attribute information of the specific file 214. For example, the processor 210 may identify whether the specific file 214 is included in a least recently used (LRU) list or a most recently used list. The processor 210 according to various embodiments may manage and store least recently used applications in the LRU list. The processor 210 according to various embodiments may record and manage most recently used applications or files in the most recently used list through the operating system (OS) or machine running.

The processor 210 according to various embodiments may set a flag in the created request to read the data based on the identified information of the file. For example, the processor 210 may set the flag in the created request to read the data, in response to a case where the specific file 214 is a file being used to execute a specific application. For example, the processor 210 may set the flag in the created request to read the data, in response to a case where the specific file 214 is included in the least recently used (LRU) list or the most recently used list.

For example, if the extension of the specific file 214 of which the request to read the data is created is apk, the processor 210 according to various embodiments may identify that the specific file 214 is the file being used to execute the specific application. Further, the processor 210 may set a flag (e.g., HOST HPB flag) in the created request to read the data.

At operation ③, the processor 210 according to various embodiments may identify whether the flag is set in the created request to read the data and whether the mapping information of the specific region including a logical address of the data is stored in the first RAM (e.g., first volatile memory) 400. Mapping information 411 of a first region (e.g., region "1") indicated by dotted lines in the first RAM 400 is mapping information which has not yet been loaded from a NAND flash memory (e.g., nonvolatile memory) 310 and thus has not yet been stored in the first RAM 400, and thus it may refer, for example, to mapping information to be loaded from the NAND flash memory 310 later. It may be assumed that the specific region of the mapping information including the specific data is a first region (e.g., region "1") 411. Because the flag is currently set in the created request to read the data, the processor 210 may determine that the mapping information 411 of the specific region including the data is managed by the first RAM 400 of the host end. The processor 210 may set a reference flag 411a of the mapping information 411 of the first region to "1", in relation to information on the first region (e.g., region "1") among the mapping information to be stored in the first RAM 400. The case where the reference flag 411a of the mapping information of the first region has a value of "1" may refer, for example, to the mapping information 411 of the first region being managed by the first RAM 400 of the host 40 end. Because the mapping information 411 of the first region is not currently stored in the first RAM 400 (indicated by dotted lines), the processor 210 may set an update flag (need_update flag) 411b of the mapping information 411 of the first region to "1", in relation to the information on the first region among the mapping information to be stored in the first RAM 400. The case where the update flag 411b of the mapping information 411 of the first region has a value of "1" may refer, for example, to it being necessary to update the mapping information 411 of the first region from the NAND flash memory (e.g., nonvolatile memory) 310 of a storage 300 into the first RAM 400.

At operation ④, the processor 210 according to various embodiments may transmit the request to read the data including the logical address of the data to a storage host controller 220 by executing a storage driver 215 of the storage 300. For example, because the mapping information 411 of the first region is not currently stored in the first RAM 400, the processor 210 may not identify the physical address of the specific data using the information stored in the first RAM 400. The processor 210 may transmit the request to read the data including the logical address of the specific information to the storage host controller 220. For example, the processor 210 may transmit the request to read the data including logical address "1" of the specific data to the storage host controller 220.

At operation ⑤, the processor 210 according to various embodiments may transmit the request to read the data including the logical address of the data to the storage 300 through the storage host controller 220.

At operation ⑥, the storage 300 according to various embodiments may identify whether address information corresponding to the data is included in the mapping information of the partial region stored (e.g., cached) in a second RAM (e.g., volatile memory) 320 of the storage 300, based on the control of a storage controller 330. For example, the second RAM 320 of the storage 300 may store the partial region of mapping information (e.g., L2P table) 311 stored in the NAND flash memory (e.g., nonvolatile memory) 310. For example, the second RAM 320 of the storage 300 may store and use only a part of the mapping information (e.g., L2P table) 311 stored in the NAND flash memory 310 because the second RAM 320 has a small size. If the address information corresponding to the data is included in the mapping information of the partial region stored in the second RAM 320 of the storage 300, the storage controller 330 may identify the physical address, mapped onto the logical address of the data, from the mapping information of the partial region stored in the second RAM 320. The storage controller 330 according to various embodiments may process the request to read the data by accessing the identified physical address of the data in a physical NAND cell.

At operation ⑦, the processor 210 according to various embodiments may transmit the update request for the mapping information 411 of the specific region in the first RAM 400 to the storage 300 by executing the storage driver 215 of the storage 300. For example, because the update flag 411b for the mapping information 411 of the first region in the first RAM 400 is set to "1", the processor 210 may transmit the update request for the mapping information 411 of the first region to the storage 300. In response to the reception of the update request, the storage 300 according to various embodiments may extract and transmit the mapping information 411 of the first region to the processor 210.

At operation ⑧, the processor 210 according to various embodiments may receive the mapping information of the specific region from the storage 300 and it may store the received mapping information in the first RAM 400. The mapping information 411 of the first region indicated by dotted lines in the first RAM 400 may be loaded into the first RAM 400 through the operation ⑧. In the case where the mapping information 411 of the specific region is completely updated, the processor 210 according to various embodiments may change the update flag (need_update flag) 411b of the mapping information 411 of the first region, stored in the first RAM 400, to "0". If the update flag 411b of the mapping information 411 of the first region has a value of "0", it may refer, for example, to it not being necessary to update the mapping information 411 of the first region stored in the first RAM 400.

According to various embodiments, the operations ⑥ and ⑦ of updating the mapping information of the specific region may be performed in response to a case where the request to read the data is completely processed or in response to a case where the request for the data is completely processed in all and there is not the request for the data being currently processed.

FIG. 7 is a block diagram illustrating an example process in which an electronic device processes a request to read data in the case where mapping information of a specific region corresponding to the data exists in a first RAM 400 of a host 40 end when the request to read the data is created according to various embodiments. Hereinafter, the contents overlapping the contents described above with reference to FIG. 6 may not be repeated here in the description with reference to FIG. 7.

With reference to FIG. 7, a processor 210 according to various embodiments, at operation ①, may identify a creation of a request to read data included in a specific file (e.g., data read I/O request) during an execution of an application. The processor 210 according to various embodiments may identify, through a file system 213, a logical address of the data of the specific file of which the request to read the data is created. For example, the processor 210 may identify the creation of the request to read data 214b corresponding to a logical address "2" among data included in an A.apk file 214.

At operation ②, the processor 210 according to various embodiments may identify, through the file system 213, information of the specific file 214 of which the request to read the data is created.

The processor 210 according to various embodiments may set a flag in the created request to read the data based on the identified information of the file 214.

For example, because the extension of the specific file 214 of which the request to read the data is created is apk, the processor 210 according to various embodiments may identify that the specific file 214 is a file being used to execute a specific application, and it may set a flag (e.g., HOST HPB flag) in the created request to read the data.

At operation ③, the processor 210 according to various embodiments may identify whether the flag is set in the created request to read the data and whether mapping information (e.g., HPB L2P table) of a specific region including a logical address of the data is stored in the first RAM (e.g., first volatile memory) 400. Mapping information 411 of a first region (e.g., region "1") indicated by solid lines in the first RAM 400 may be mapping information which has been loaded from a NAND flash memory (non-volatile memory) 310 and thus has been currently stored in the first RAM 400. It is assumed that the specific region of the mapping information including the specific data is a first region (e.g., region "1") 411. Because the flag is currently set in the created request to read the data, the processor 210 may determine that the mapping information 411 of the specific region including the data is managed by the first RAM 400 of the host end. The processor 210 may set a reference flag 411a of the mapping information 411 of the first region to "1", in relation to information on the first region (e.g., region "1") 411 among the mapping information stored (or to be stored) in the first RAM 400. Because the mapping information 411 of the first region is currently stored in the first RAM 400 (indicated by solid lines), the processor 210 may set an update flag (need_update flag) 411b of the mapping information 411 of the first region to "0", in relation to the information on the first region among the mapping information stored in the first RAM 400. The case where the update flag 411b of the mapping information 411 of the first region has a value of "0" may refer, for example, to it not being necessary to update the mapping information 411 of the first region from the NAND flash memory (e.g., non-volatile memory) 310 of a storage 300 into the first RAM 400.

The processor 210 according to various embodiments may identify the physical address, mapped onto the logical address of the data 214b, using the mapping information 411 of the specific region stored in the first RAM 400. For example, the processor 210 may identify through the mapping information 411 of the first region stored in the first RAM 400 that the physical address being mapped onto the logical address 2 of the data 214b is "7".

At operation ④, the processor 210 according to various embodiments may transmit the request to read the data including the physical address of the data to a storage host controller 220 by executing a storage driver 215 of the storage 300. For example, because the mapping information 411 of the first region is stored in the first RAM 400, the processor 210 may identify the physical address of the specific data 214b using the information stored in the first RAM 400. The processor 210 may transmit the request to read the data including the physical address of the specific data to the storage host controller 220. For example, the processor 210 may transmit the request to read the data including the physical address "7" of the specific data to the storage host controller 220.

At operation ⑤, the processor 210 according to various embodiments may transmit the request to read the data including the physical address of the data to the storage 300 through the storage host controller 220.

At operation ⑥, the storage 300 according to various embodiments may process the request to read the data by accessing the identified physical address of the data in a physical NAND cell, under the control of a storage controller 330.

Figure 8:
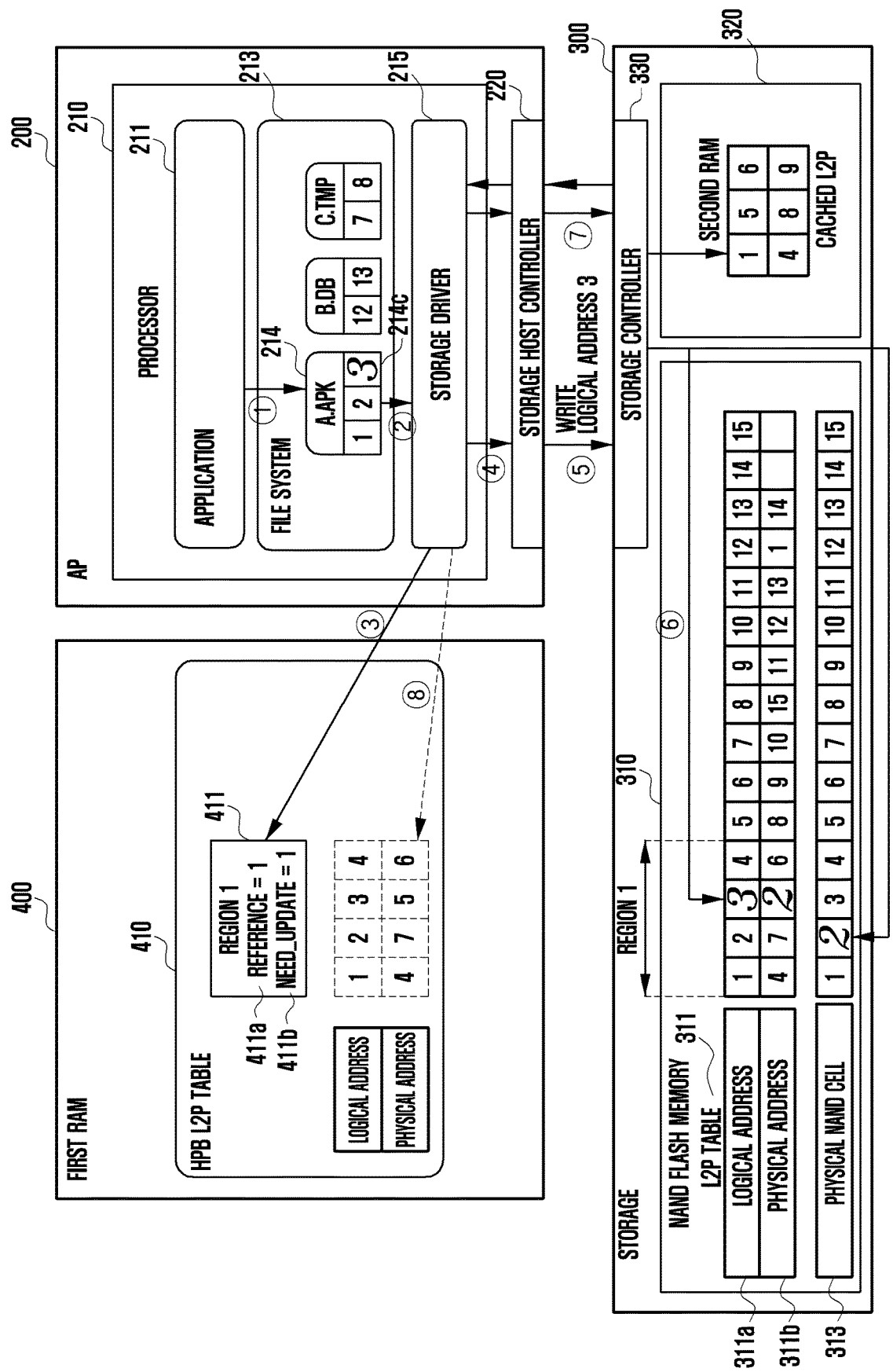
FIG. 8 is a block diagram of an electronic device illustrating an example process in which the electronic device processes a request to write data according to various embodiments of the disclosure.

FIG. 8 is a block diagram of an electronic device illustrating an example process in which the electronic device processes a request to write data according to various embodiments of the disclosure.

With reference to FIG. 8, a processor 210 according to various embodiments, at operation ①, may identify a creation of a request to write data included in a specific file (e.g., data write I/O request), in order to update an application 211 during an execution of the application 211. The processor 210 according to various embodiments may identify the kind of the created request for the data, and it may identify that the created request for the data is the request to write the data. The processor 210 according to various embodiments may identify, through a file system 213, a logical address of the data of the specific file of which the request to write the data is created. For example, the processor 210 may identify the creation of the request to write data 214c corresponding to a logical address "3" among data included in an A.apk file 214.

At operation ②, the processor 210 according to various embodiments may identify, through the file system 213, information of the specific file 214 in which the request to write the data is created. For example, the processor 210 may identify an extension and attribute information of the specific file 214. The processor 210 according to various embodiments may set a flag in the created request to write the data based on the identified information of the file. For example, the processor 210 may set the flag in the created request to write the data, in response to a case where the specific file 214 is a file being used to execute a specific application.

For example, the processor 210 according to various embodiments may identify that the specific file 214 is the file being used to execute the specific application, in response to a case where it is identified that the extension of the specific file 214 of which the request to write the data is created is apk and has an executable file attribute. The processor 210 may set a flag (e.g., HOST HPB flag) in the created request to write the data, in response to a case where it is identified that the specific file 214 is the file being used to execute the specific application.

At operation ③, the processor 210 according to various embodiments may identify whether the flag is set in the created request to write the data and whether mapping information (e.g., HPB L2P table) of a specific region including the logical address of the data is stored in a first RAM (e.g., first volatile memory) 400. Mapping information 411 of a first region (e.g., region "1") indicated by dotted lines in the first RAM 400 may refer, for example, to mapping information to be updated from a NAND flash memory 310 later. It is assumed that the specific region of the mapping information including the specific data is the first region (e.g., region "1"). Because the flag is currently set in the created request to write the data, the processor 210 may determine that the mapping information 411 of the specific region including the data is managed by the first RAM 400 of the host 40 end. The processor 210 may set a reference flag 411a of the mapping information 411 of the first region to "1", in relation to information on the first region (region "1") among the mapping information stored (or to be stored) in the first RAM 400.

Because the created request for the data is the request to write the data, the processor 210 according to various embodiments may determine that the mapping information 411 of the first region that is currently stored in the first RAM 400 will be changed (indicated by dotted lines) later, and the processor 210 may set an update flag (need_update flag) 411b of the mapping information 411 of the first region to "1", in relation to the information on the mapping information 411 of the first region among the mapping information stored (or to be stored) in the first RAM 400. The case where the update flag 411b of the mapping information 411 of the first region has a value of "1" may refer, for example, to it being necessary to update the mapping information 411 of the first region from the NAND flash memory (nonvolatile memory) 310 of a storage 300 into the first RAM 400.

At operation ④, the processor 210 according to various embodiments may transmit the request to write the data including the logical address of the data to a storage host controller 220 by executing a storage driver 215. For example, the processor 210 may transmit the request to write the data including a logical address "3" of the specific data to the storage host controller 220.

At operation ⑤, the processor 210 according to various embodiments may transmit the request to write the data including the logical address of the data to the storage 300 through the storage host controller 220.

At operation ⑥, a storage controller 330 according to various embodiments may perform the request to write the data for the logical address in the NAND flash memory (nonvolatile memory) 310. For example, the storage controller 330 may identify that the physical address corresponding to the logical address "3" among mapping information 311 in the NAND flash memory 310 has been changed to "2" due to the request to write the data.

At operation ⑦, the processor 210 according to various embodiments may transmit the update request for the mapping information of the specific region in the first RAM 400 to the storage 300 by executing the storage driver 215 of the storage 300. For example, because the update flag 411b for the mapping information 411 of the first region in the first RAM 400 is set to "1", the processor 210 may transmit the update request for the mapping information 411 of the first region to the storage 300. In response to the reception of the update request, the storage 300 according to various embodiments may extract the mapping information of the first region from the NAND flash memory 310 and transmit the extracted mapping information to the processor 210.

At operation ⑧, the processor 210 according to various embodiments may receive the mapping information of the specific region from the storage 300 and it may store the received mapping information in the first RAM 400. The mapping information 411 of the first region indicated by dotted lines in the first RAM 400 may be loaded into the first RAM 400 through the operation ⑧. In the case where the mapping information 411 of the specific region is completely updated, the processor 210 according to various embodiments may change the update flag (need_update flag) 411b of the mapping information 411 of the first region, stored in the first RAM 400, to "0". If the update flag 411b of the mapping information 411 of the first region has a value of "0", it may refer, for example, to it not being necessary to update the mapping information 411 of the first region stored in the first RAM 400.

According to various embodiments, the operations ⑥ and ⑦ of updating the mapping information of the specific region may be performed in response to a case where the request to write the data is completely processed or in response to a case where the request for the data is completely processed and there is not the request for the data being currently processed.

Figure 9:
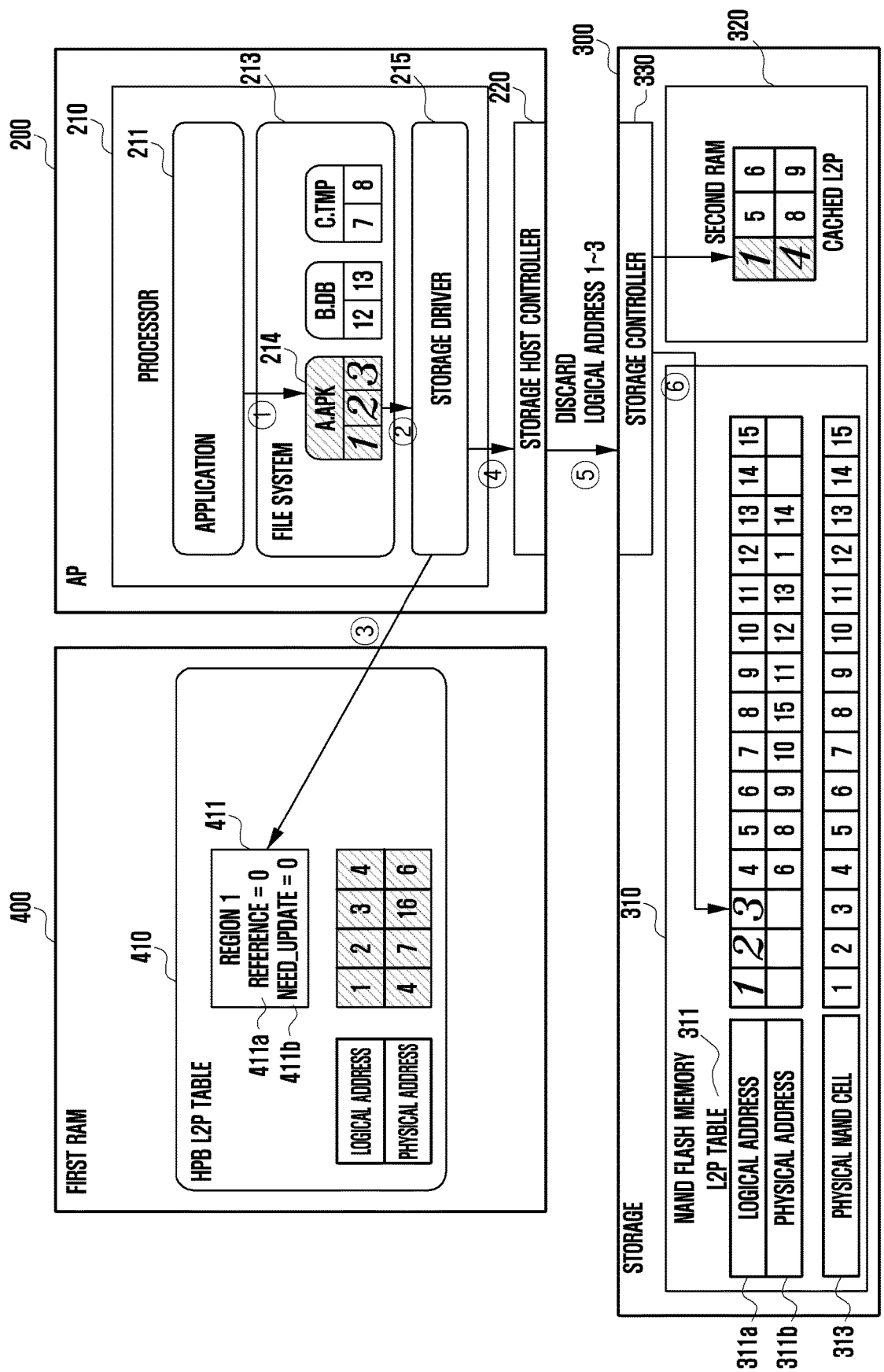
FIG. 9 is a block diagram of an electronic device illustrating an example process in which the electronic device processes a request to delete data according to various embodiments of the disclosure.

FIG. 9 is a block diagram of an electronic device illustrating an example process in which the electronic device processes a request to delete data according to various embodiments of the disclosure.

With reference to FIG. 9, a processor 210 according to various embodiments, at operation ①, may identify a creation of a request to delete a specific file (e.g., data delete I/O request or data discard I/O request). The processor 210 according to various embodiments may identify the kind of the created request for the data (e.g., read/write/delete request), and it may identify that the created request for the data is the request to delete the data. The processor 210 according to various embodiments may identify, through a file system 213, a logical address of the data of the specific file of which the request to delete the data is created. For example, the processor 210 may identify the creation of the request to delete data corresponding to logical addresses "1" to "3" included in an A.apk file 214 in order to delete the A.apk file 214.

At operation ②, the processor 210 according to various embodiments may identify, through the file system 213, information of the specific file 214 of which the request to delete the data is created. The processor 210 according to various embodiments may set a flag in the created request to delete the data, based on the identified information of the file.

At operation ③, the processor 210 according to various embodiments may determine that mapping information of a specific region including the data is not managed by a first RAM 400 of a host end, in response to a case where the created request for the data is the request to delete the data. The processor 210 may set a reference flag 411a of mapping information 411 of a first region (e.g., region "1") to "0", in relation to information on the first region (e.g., region "1") in a mapping table 410 stored in the first RAM 400. The processor 210 according to various embodiments may set an update flag (need_update flag) 411b of the mapping information 411 of the first region to "0", in response to the case where the created request for the data is the request to delete the data. The processor 210 according to various embodiments may delete (or unload) the mapping information 411 of the specific region from the first RAM 400. The mapping information 411 of the specific region indicated by hatched lines, which is stored in the first RAM 400, may refer, for example, to mapping information to be deleted later.

At operation ④, the processor 210 according to various embodiments may transmit the request to delete the data including a logical address of the data to a storage host controller 220 by executing a storage driver 215. For example, the processor 210 may transmit the request to delete the data including the logical addresses "1" to "3" to the storage host controller 220.

At operation ⑤, the processor 210 according to various embodiments may transmit the request to delete the data including the logical addresses to a storage 300 through the storage host controller 220.

At operation ⑥, a storage controller 330 according to various embodiments may process the request to delete the data by means of a NAND flash memory (e.g., nonvolatile memory) 310. For example, the storage controller 330 may delete the physical addresses mapped onto the logical addresses "1" to "3" of the data.

Figure 10:
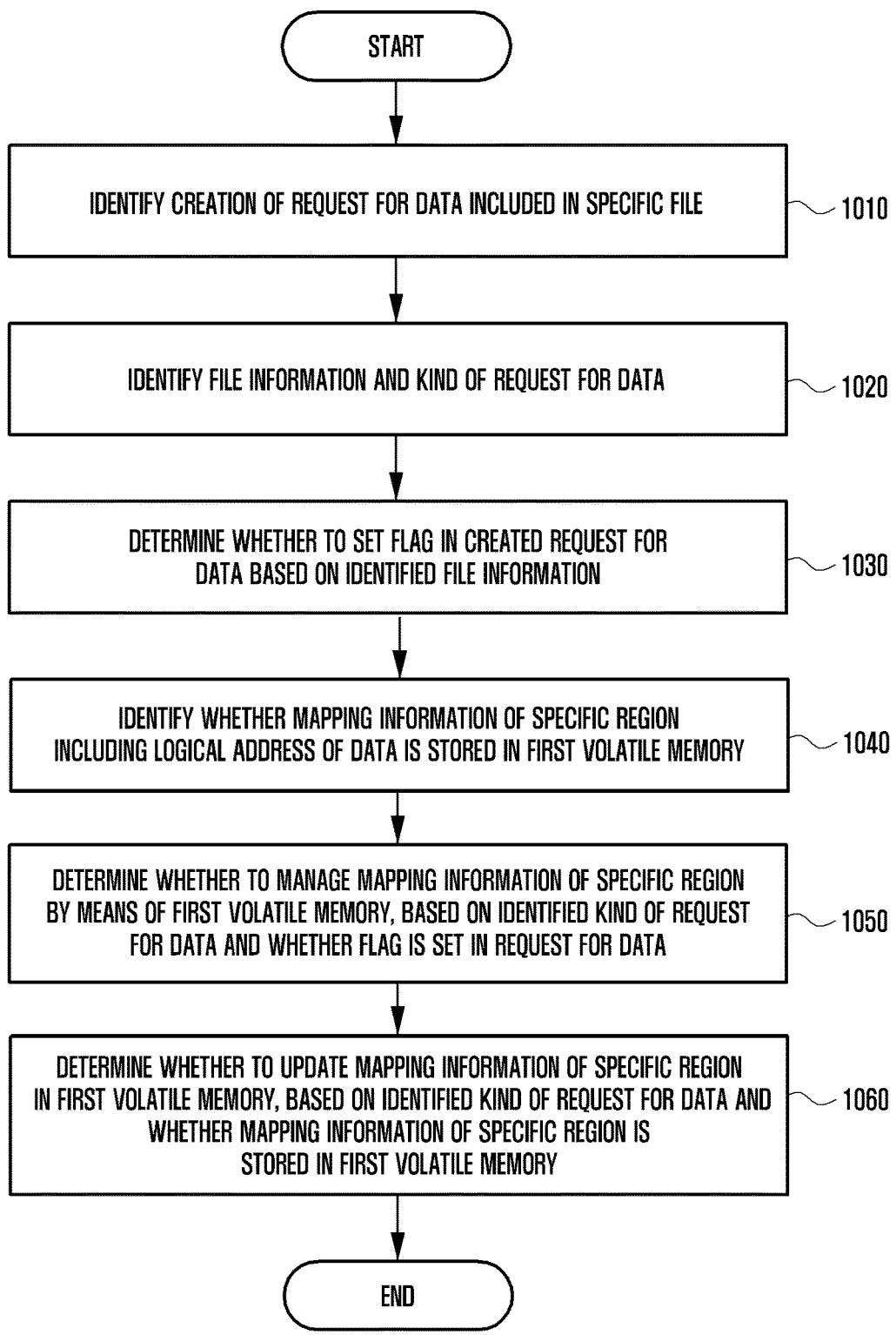
FIG. 10 is a flowchart illustrating an example operation of an electronic device according to various embodiments of the disclosure.

FIG. 10 is a flowchart illustrating an example operation of an electronic device according to various embodiments of the disclosure.

With reference to an operational flowchart 1000, a processor 210 (e.g., file system 213 of FIG. 4) according to various embodiments, at operation 1010, may identify a creation of a request for data included in a specific file.

At operation 1020, the processor 210 (e.g., file system 213 of FIG. 4) according to various embodiments may identify information of the specific file and the kind (or type) of the request for the data, in response to the creation of the request for the data included in the specific file. For example, the processor 210 may identify an extension (e.g., apk, vdex, so, sc, or lib) of the specific file and attribute information (e.g., executable file). For example, the processor 210 may identify whether the specific file is included in a least recently used (LRU) list or a most recently used list. For example, the processor 210 may manage and store least recently used applications in the LRU list. For example, the processor 210 may record and manage most recently used applications or files in the most recently used list through the operating system (OS) or machine running. For example, the processor 210 may identify whether the created request for the data is a request to read the data, a request to write the data, or a request to delete the data.

At operation 1030, the processor 210 (e.g., file system 213 of FIG. 4) according to various embodiments may determine whether to set a flag in the created request for the data based on the identified information of the specific file. For example, the processor 210 may set the flag in the created request for the data, in response to a case where the specific file is determined to be a file being used to execute a specific application. For example, the processor 210 may determine whether it is suitable to manage mapping information of the specific region corresponding to the data by means of a first volatile memory (e.g., first RAM 400 of FIG. 4) of a host 40 end, by identifying whether the specific file is a read-only file, and the processor 210 may set the flag in the request for the data, in response to a case where the processor 210 determines that it is suitable to manage the mapping information by means of the first volatile memory (e.g., first RAM 400 of FIG. 4).

At operation 1040, the processor 210 (e.g., storage driver 215) according to various embodiments may identify whether the mapping information of the specific region including a logical address of the data is stored in the first volatile memory (e.g., first RAM 400 of FIG. 4). For example, the processor 210 may identify whether the mapping information of the specific region including the logical address of the data, among mapping information (e.g., L2P mapping information 311 in the NAND flash memory 310 of FIG. 4) in which logical addresses and physical addresses for a nonvolatile memory (e.g., NAND flash memory 310 of FIG. 4) of a storage 300 are mapped onto each other, is stored in the first volatile memory (e.g., first RAM 400 of FIG. 4).

At operation 1050, the processor 210 (e.g., storage driver 215) according to various embodiments may determine whether to manage the mapping information of the specific region by means of the first volatile memory (e.g., first RAM 400 of FIG. 4) based on the identified kind of the request for the data and whether the flag is set in the request for the data. For example, if the identified kind of the request for the data is a request to read the data, and the flag is set in the request for the data, the processor 210 may determine that the mapping information of the specific region is managed by the first volatile memory (e.g., first RAM 400 of FIG. 4). For example, if the identified kind of the request for the data is a request to write the data, and the flag is set in the request for the data, the processor 210 may determine that the mapping information of the specific region is managed by the first volatile memory (e.g., first RAM 400 of FIG. 4). For example, if the identified kind of the request for the data is a request to delete the data, the processor 210 may determine that the mapping information of the specific region is not managed by the first volatile memory (e.g., first RAM 400 of FIG. 4).

The processor 210 (e.g., storage driver 215) according to various embodiments may set a reference flag 411a for the specific region in the first volatile memory (e.g., first RAM 400 of FIG. 4) to "1", in response to a case where the mapping information of the specific region is determined to be managed by the first volatile memory (e.g., first RAM 400 of FIG. 4). For example, the processor 210 may set the reference flag 411a for the specific region in the first volatile memory (e.g., first RAM 400 of FIG. 4) to "0", in response to a case where the mapping information of the specific region is determined to be not managed by the first volatile memory (e.g., first RAM 400 of FIG. 4).

At operation 1060, the processor 210 (e.g., storage driver 215) according to various embodiments may determine whether to update the mapping information of the specific region in the first volatile memory (e.g., first RAM 400 of FIG. 4), based on the identified kind of the request for the data and whether the identified mapping information of the specific region is stored in the first volatile memory (e.g., first RAM 400 of FIG. 4).

For example, the processor 210 may determine that it is not necessary to update the mapping information of the specific region in the first volatile memory (e.g., first RAM 400 of FIG. 4), based on a case where the identified request for the data is the request to read the data, and the mapping information of the specific region is stored in the first volatile memory (e.g., first RAM 400 of FIG. 4).

For example, the processor 210 may determine that it is necessary to update the mapping information of the specific region in the first volatile memory (e.g., first RAM 400 of FIG. 4), based on a case where the identified request for the data is the request to read the data, and the mapping information of the specific region is not stored in the first volatile memory (e.g., first RAM 400 of FIG. 4).

For example, the processor 210 may determine that it is necessary to update the mapping information of the specific region in the first volatile memory (e.g., first RAM 400 of FIG. 4) if the identified request for the data is the request to write the data.

For example, the processor 210 may determine that it is not necessary to update of the mapping information of the specific region in the first volatile memory (e.g., first RAM 400 of FIG. 4) if the identified request for the data is the request to delete the data.

The processor 210 according to various embodiments may set an update flag 411*b* for the specific region in the first volatile memory (e.g., first RAM 400 of FIG. 4) to "1", in response to a case where it is determined that it is necessary to update the mapping information of the specific region. For example, the processor 210 may set the update flag 411*b* for the specific region in the first volatile memory (e.g., first RAM 400 of FIG. 4) to "0", in response to a case where it is determined that it is not necessary to update the mapping information of the specific region.

Figure 11:
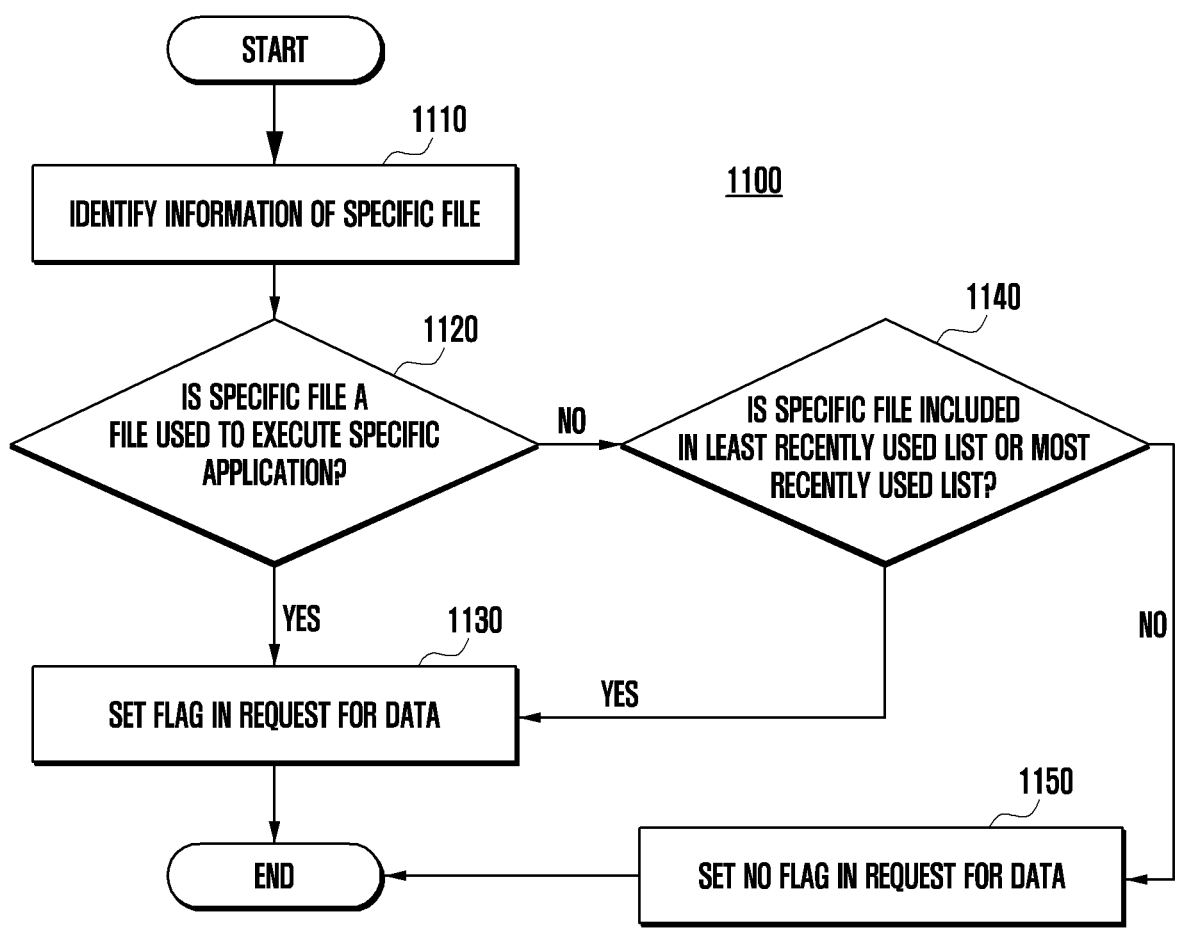
FIG. 11 is a flowchart illustrating an example operation of an electronic device according to various embodiments of the disclosure.

FIG. 11 is a flowchart illustrating an example operation of an electronic device according to various embodiments of the disclosure.

An operational flowchart 1100 illustrates examples of detailed operations for the operations 1020 and 1030 of FIG. 10.

With reference to the operational flowchart 1100, a processor 210 (e.g., file system 213 of FIG. 4) according to various embodiments, at operation 1110, may identify information of a specific file, in response to a creation of a request for data included in the specific file.

At operation 1120, the processor 210 according to various embodiments may determine whether the specific file is a file being used to execute a specific application as the result of the identification. For example, the processor 210 may determine whether the specific file is the file being used to execute the specific application, by identifying an extension and attribute information of the specific file. For example, if the extension of the specific file is apk, vdex, so, sc, or lib, and the attribute of the specific file is an executable file attribute, the processor 210 may determine that the specific file is the file being used to execute the specific application.

If the specific file is determined to be the file being used to execute the specific application, the processor 210 may set a flag in the request for the data through a branch into operation 1130 (1120-YES).

If it is determined that the specific file is not the file being used to execute the specific application, the processor 210 may identify whether the specific file is included in a least recently used (LRU) list or a most recently used list, through a branch into operation 1140 (1120-NO).

The processor 210 may set a flag in the request for the data through a branch into operation 1130 (1140-YES), in response to a case where the specific file is included in the least recently used list or the most recently used list as the result of the identification.

The processor 210 may not set a flag in the request for the data through a branch into operation 1150 (1140-NO), in response to a case where the specific file is not included in the least recently used list or the most recently used list as the result of the identification.

Figure 12A:
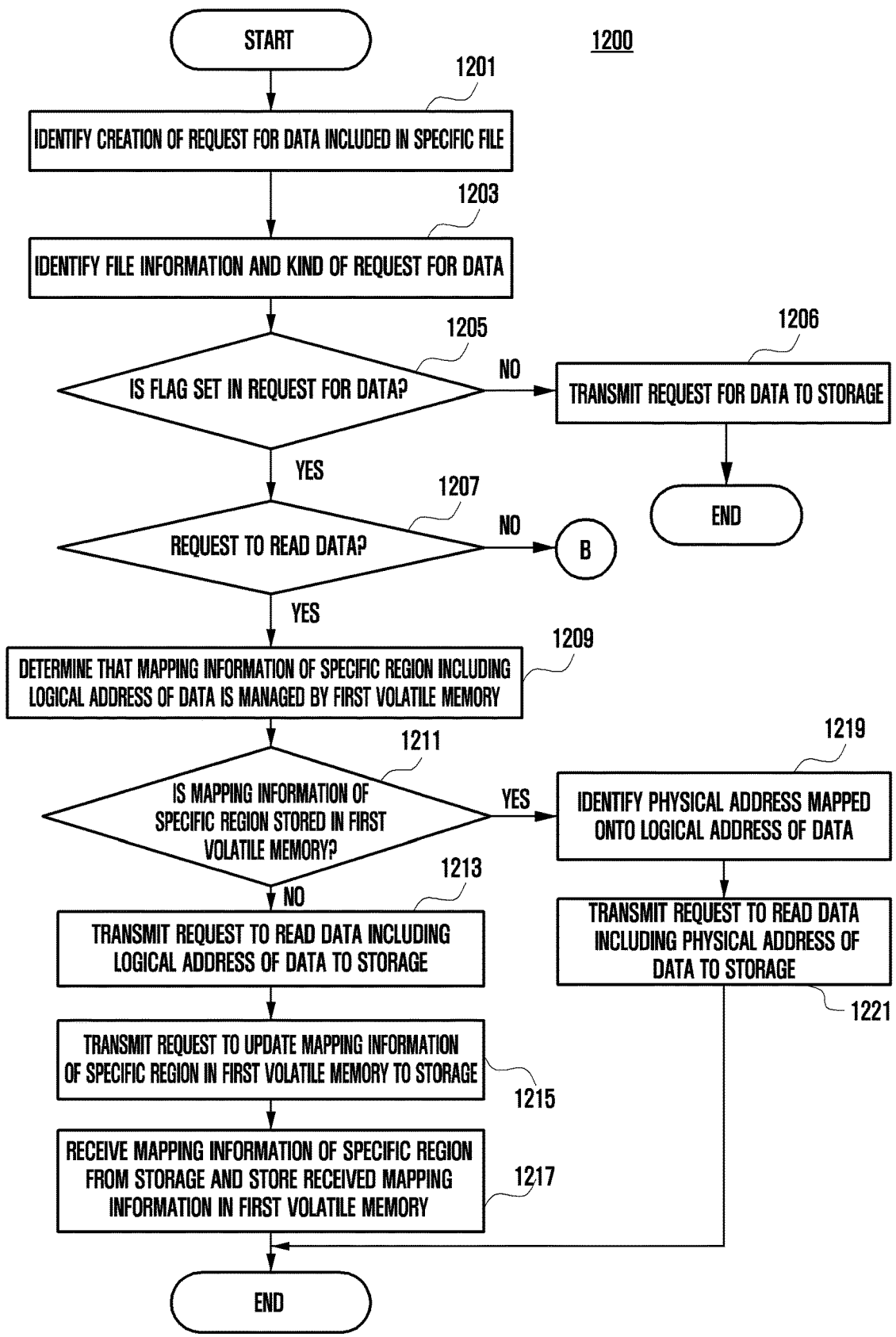
FIG. 12A is a flowchart illustrating an example operation of an electronic device according to various embodiments of the disclosure.
Figure 12B:
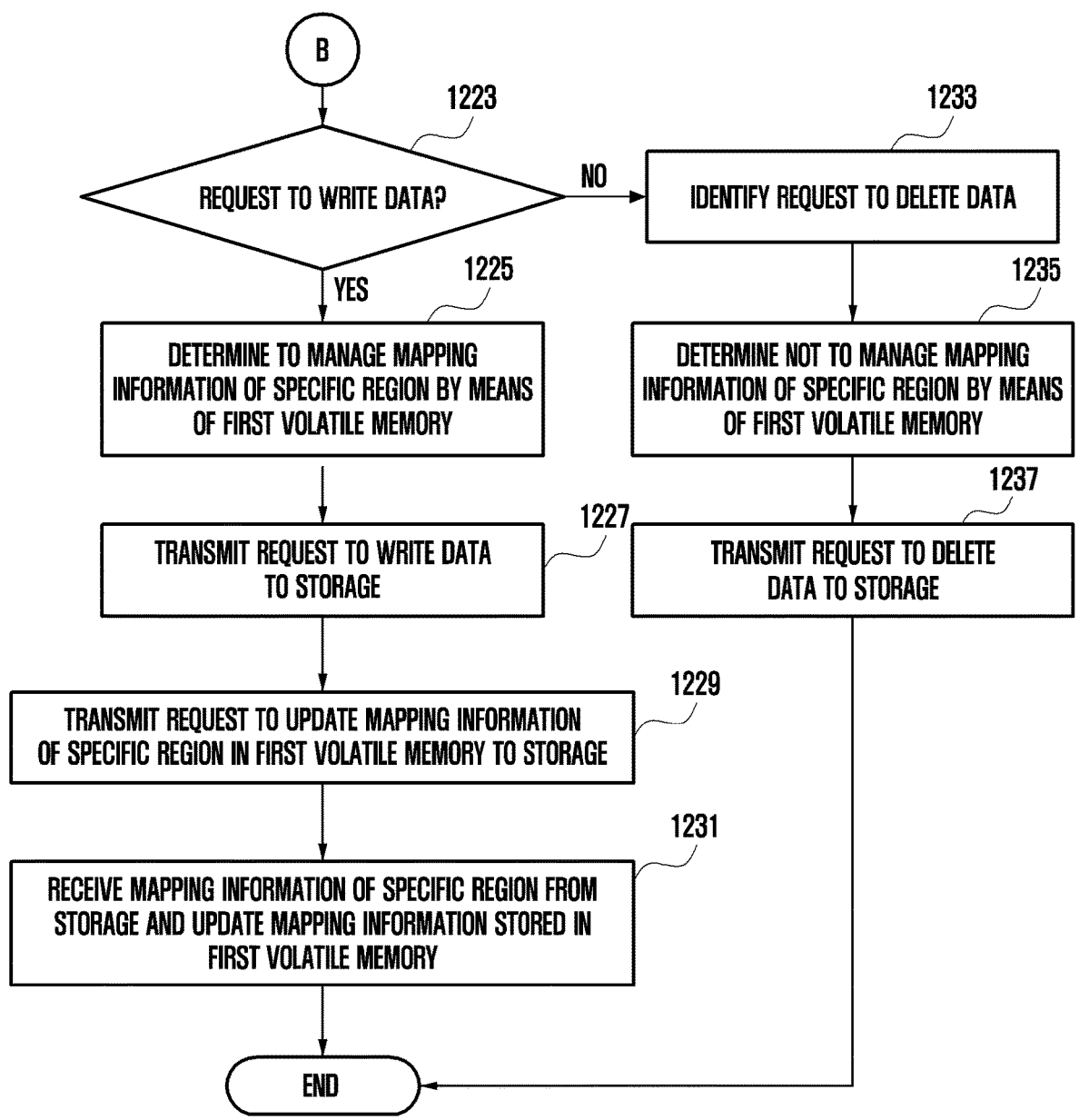
FIG. 12B is a flowchart illustrating an example operation of an electronic device according to various embodiments of the disclosure.

FIGS. 12A and 12B are flowcharts illustrating an example operation of an electronic device according to various embodiments of the disclosure. Explanation of the contents overlapping the contents described above with reference to FIGS. 10 and 11 may not be repeated here.

With reference to an operational flowchart 1200, a processor 210 (e.g., file system 213 of FIG. 4) according to various embodiments, at operation 1201, may identify a creation of a request for data included in a specific file.

At operation 1203, the processor 210 according to various embodiments may identify file information of the specific file and the kind of the request for the data (e.g., read/write/delete request).

At operation 1205, the processor 210 according to various embodiments may determine whether a flag is set in the request based on the identified information of the specific file. For example, if it is determined that the specific file is a file being used to execute a specific application, or if the specific file is included in a least recently used (LRU) list or a most recently used list, the processor 210 may set the flag in the request for the data.

If the flag is not set in the request for the data, the processor 210 may directly transmit the request for the data to a storage 300 through a branch into operation 1206 (1205-NO).

If the flag is set in the request for the data, the processor 210 may identify whether the request for the data is the request to read the data through a branch into operation 1207 (1205-YES).

If the request for the data is not the request to read the data as the result of the identification, the operation of the processor 210 may branch out into operation B (1207-NO). The operation B will be described below with reference to FIG. 12B.

If the request for the data is the request to read the data as the result of the identification, the processor 210 may determine that mapping information of a specific region including a logical address of the data is managed by a first volatile memory (e.g., first RAM 400 of FIG. 4), through a branch into operation 1209 (1207-YES). For example, if the flag is set in the created request to read the data, the processor 210 may determine that the mapping information of the specific region including the logical address of the data is managed by the first volatile memory (e.g., first RAM 400 of FIG. 4).

At operation 1211, the processor 210 according to various embodiments may identify whether the mapping information of the specific region is stored in the first volatile memory (e.g., first RAM 400 of FIG. 4).

If the mapping information of the specific region is stored in the first volatile memory (e.g., first RAM 400 of FIG. 4) as the result of the identification, the processor 210 may identify a physical address, mapped onto the logical address of the data, using the mapping information of the specific region stored in the first volatile memory (e.g., first RAM 400 of FIG. 4), through a branch into operation 1219 (1211-YES). At operation 1221, the processor 210 according to various embodiments may transmit the request to read the data including the physical address of the data to the storage 300.

If the mapping information of the specific region is not stored in the first volatile memory (e.g., first RAM 400 of FIG. 4) as the result of the identification, the processor 210 may transmit the request to read the data including the logical address of the data to the storage 300, through a branch into operation 1213 (1211-NO).

At operation 1215, the processor 210 according to various embodiments may determine that it is necessary to update the mapping information of the specific region in the first volatile memory (e.g., first RAM 400 of FIG. 4), and thus the processor 210 may transmit a request to update the mapping information of the specific region in the first volatile memory (e.g., first RAM 400 of FIG. 4) to the storage 300.

At operation 1217, the processor 210 according to various embodiments may receive the mapping information of the specific region from the storage 300, in response to the transmission of the update request, and it may store the received mapping information of the specific region in the first volatile memory (e.g., first RAM 400 of FIG. 4).

According to various embodiments, the operations 1215 and 1217 for updating the mapping information of the specific region may be performed in response to a case where the request to read the data is completely processed or in response to a case where the request for the data is completely processed and there is not the request for the data being currently processed.

With reference to FIG. 12B, the processor 210 (e.g., file system 213 of FIG. 4) according to various embodiments, at operation B, may identify whether the request for the data is a request to write the data, through a branch into operation 1223.

If the request for the data is the request to write the data as the result of the identification, the processor 210 may determine that the mapping information of the specific region is managed by the first volatile memory (e.g., first RAM 400 of FIG. 4), through a branch into operation 1225 (1223-YES).

At operation 1227, the processor 210 according to various embodiments may transmit the request to write the data including the logical address of the data to the storage 300.

At operation 1229, the processor 210 according to various embodiments may determine that it is necessary to update the mapping information of the specific region in the first volatile memory (e.g., first RAM 400 of FIG. 4), in response to a case where the request for the data is the request to write the data, and the processor 210 may transmit the request to update the mapping information of the specific region in the first volatile memory (e.g., first RAM 400 of FIG. 4) to the storage 300.

At operation 1231, the processor 210 according to various embodiments may receive the request to update the mapping information of the specific region from the storage 300, in response to the transmission of the request to update the mapping information of the specific region, and the processor 210 may perform the update by storing the received mapping information of the specific region in the first volatile memory (e.g., first RAM 400 of FIG. 4).

If the request for the data is not the request to write the data as the result of the identification, the processor 210 may identify that the request for the data is a request to delete the data, through a branch into operation 1233 (1223-NO).

At operation 1235, the processor 210 according to various embodiments may determine that the mapping information of the specific region is not managed by the first volatile memory (e.g., first RAM 400 of FIG. 4), in response to a case where the request for the data is the request to delete the data.

At operation 1237, the processor 210 according to various embodiments may transmit the request to delete the data including the logical address of the data to the storage 300.

According to various embodiments, the operations 1229 and 1231 for updating the mapping information of the specific region may be performed in response to a case where the request to write the data is completely processed or in response to a case where the request for the data is completely processed and there is not the request for the data being currently processed.

Figure 13:
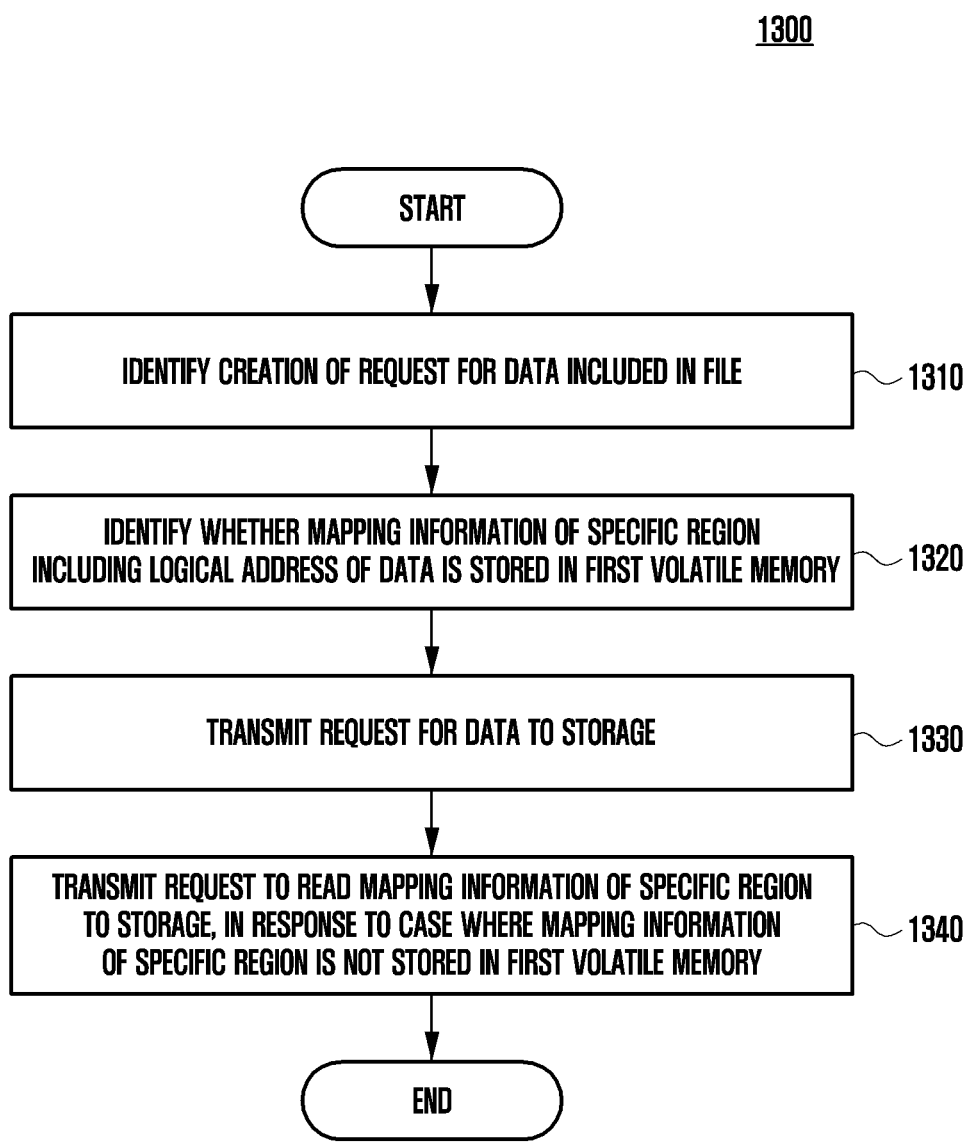
FIG. 13 is a flowchart illustrating an example operation of an electronic device according to various embodiments of the disclosure.

FIG. 13 is a flowchart illustrating an example operation of an electronic device according to various embodiments of the disclosure.

With reference to an operational flowchart 1300, a processor 210 (e.g., file system 213 of FIG. 4) according to various embodiments, at operation 1310, may identify whether a request for data included in a file is created. At operation 1320, the processor 210 according to various embodiments may identify whether mapping information of a specific region including a logical address of the data is stored in a first volatile memory (e.g., first RAM 400 of FIG. 4), in response to the creation of the request for the data included in the file.

At operation 1330, the processor 210 according to various embodiments may transmit the request for the data to a storage 300. For example, the processor 210 may transmit the request for the data including the logical address of the data to the storage 300, in response to a case where the mapping information of the specific region is not stored in the first volatile memory. For example, the processor 210 may identify a physical address, corresponding to the logical address of the data, through the mapping information of the specific region, in response to a case where the mapping information of the specific region is stored in the first volatile memory, and the processor 210 may transmit the request for the data including the physical address of the data to the storage 300.

At operation 1340, the processor 210 according to various embodiments may transmit a request to read the mapping information of the specific region to the storage 300, in response to the case where the mapping information of the specific region is not stored in the first volatile memory. In response to reception of the request to read the mapping information of the specific region, the storage 300 according to various embodiments may identify the mapping information of the specific region from a nonvolatile memory 310 of the storage 300, and it may transmit the mapping information of the specific region to the processor 210.

An electronic device (e.g., the electronic device 101) according to various example embodiments of the disclosure may include a processor (e.g., the processor 210), a first volatile memory (e.g., the first RAM 400), and a storage (e.g., the storage 300) including a nonvolatile memory (e.g., the NAND flash memory 310) and a second volatile memory (e.g., the second RAM 320). The processor according to various example embodiments may be configured to: identify information of a specific file and a kind of a request for data included in the specific file in response to a creation of the request for the data, determine whether to set a flag in the request based on the identified information of the specific file, identify whether mapping information of a specific region including a logical address of the data among mapping information in which logical addresses and physical addresses for the nonvolatile memory are mapped onto each other is stored in the first volatile memory, determine whether to manage the mapping information of the specific region using the first volatile memory based on the identified kind of the request and whether the flag is set in the request, and determine whether to update the mapping information of the specific region in the first volatile memory based on the identified kind of the request and a result of identifying whether the mapping information is stored.

In the electronic device according to various example embodiments, the processor may be configured to: identify an extension and attribute information of the specific file, and set the flag in the request for the data in response to the specific file being used to execute a specific application.

In the electronic device according to various example embodiments, the processor may be configured to: identify whether the specific file is included in a least recently used list or a most recently used list, and set the flag in the request for the data in response to a case where the specific file is included in the least recently used list or the most recently used list.

In the electronic device according to various example embodiments, the processor may be configured to determine to manage the mapping information of the specific region using the first volatile memory in response to the request for the data being a request to read the data and the flag being set in the request.

In the electronic device according to various example embodiments, the processor may be configured to transmit the request to read the data including the logical address of the data to the storage in response to the mapping information of the specific region not being stored in the first volatile memory.

In the electronic device 101 according to various example embodiments, the processor may be configured to: transmit a request to update the mapping information of the specific region in the first volatile memory to the storage, and receive the mapping information of the specific region from the storage and store the received mapping information in the first volatile memory.

In the electronic device according to various example embodiments, the processor may be configured to transmit the update request to the storage in response to the request to read the data being completely processed.

In the electronic device according to various example embodiments, the processor may be configured to transmit the update request to the storage in response to there not being the request for the data being currently processed.

In the electronic device according to various example embodiments, the processor may be configured to: identify a physical address mapped onto the logical address of the data through the mapping information of the specific region in response to the mapping information of the specific region being stored in the first volatile memory, and transmit the request to read the data including the identified physical address to the storage.

In the electronic device according to various example embodiments, the processor may be configured to: transmit a request to update the mapping information of the specific region in the first volatile memory to the storage in response to the request for the data being a request to write the data, and update the mapping information of the specific region in the first volatile memory by receiving the mapping information of the specific region from the storage.

In the electronic device according to various example embodiments, the processor may be configured to: determine to not manage the mapping information of the specific region using the first volatile memory in response to the request for the data being a request to delete the data, and transmit the request to delete the data to the storage.

In the electronic device according to various example embodiments, the mapping information of the specific region may include metadata for integrity identification.

A method for using a storage of an electronic device (e.g., the electronic device 101) according to various example embodiments of the disclosure may include identifying information of a specific file and a kind of a request for data included in the specific file in response to a creation of the request for the data, determining whether to set a flag in the request based on the identified information of the specific file, identifying whether mapping information of a specific region including a logical address of the data among mapping information in which logical addresses and physical addresses for a nonvolatile memory (e.g., the NAND flash memory 310) included in the storage (e.g., the storage 300) are mapped onto each other is stored in a first volatile memory (e.g., the first RAM 400), determining whether to manage the mapping information of the specific region using the first volatile memory based on the identified kind of the request and whether the flag is set in the request, and determining whether to update the mapping information of the specific region in the first volatile memory based on the identified kind of the request and a result of identifying whether the mapping information is stored.

In the method for using the storage of the electronic device according to various example embodiments, identifying the information of the specific file may include identifying an extension and attribute information of the specific file, and setting the flag may include setting the flag in the request for the data in response to the specific file being a file used for a specific application.

In the method for using the storage of the electronic device according to various example embodiments, determining whether to manage the mapping information of the specific region using the first volatile memory may include determining to manage the mapping information of the specific region using the first volatile memory in response to the request for the data being a request to read the data and the flag is set in the request.

The method for using the storage of the electronic device according to various example embodiments may further include transmitting the request to read the data including the logical address of the data to the storage in response to the mapping information of the specific region not being stored in the first volatile memory.

The method for using the storage of the electronic device according to various example embodiments may further include transmitting a request to update the mapping information of the specific region in the first volatile memory to the storage, and receiving the mapping information of the specific region from the storage and storing the received mapping information in the first volatile memory.

In the method for using the storage of the electronic device according to various example embodiments, transmitting the update request to the storage may include transmitting the update request to the storage in response to the request to read the data being completely processed.

An electronic device (e.g., the electronic device 101) according to various example embodiments of the disclosure may include a processor (e.g., the processor 210), a first volatile memory (e.g., the first RAM 400), and a storage (e.g., the storage 300) including a nonvolatile memory (e.g., the NAND flash memory 310) and a second volatile memory (e.g., the second RAM 320). The processor according to various embodiments may be configured to: identify whether mapping information of a specific region including a logical address of data among mapping information in which logical addresses and physical addresses for the nonvolatile memory are mapped onto each other is stored in the first volatile memory in response to a creation of a request for the data included in a file, transmit the request for the data to the storage, and transmit a request to read the mapping information of the specific region to the storage in response to the mapping information of the specific region not being stored in the first volatile memory.

In the electronic device according to various example embodiments, the processor may be configured to: transmit the request for the data including the logical address of the data to the storage in response to the mapping information of the specific region not being stored in the first volatile memory, and transmit the request for the data including a physical address of the data to the storage in response to the mapping information of the specific region being stored in the first volatile memory.

According to the electronic device according to various example embodiments of the disclosure, the processor determines and manages a partial region of the mapping information to be loaded into the volatile memory of the host device, and thus the processing speed for the request for the data desired by a user can be improved.

According to the electronic device according to various example embodiments of the disclosure, the processor determines the time when the processor loads the mapping information into the volatile memory of the host device, and thus the overhead occurrence due to the loading of the mapping information can be reduced.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. One of ordinary skill in the art will understand that various changes in form and detail may be made without departing from the true spirit and full scope of the disclosure, including the appended claims and their equivalents.

What is claimed is:

1. An electronic device comprising:
   a processor;
   a first volatile memory; and
   a storage including a nonvolatile memory and a second volatile memory, wherein the nonvolatile memory is configured to store mapping information in which logical addresses and physical addresses for the nonvolatile memory are mapped onto each other, the first volatile memory is configured to store a portion of the mapping information, and the second volatile memory is configured to store a portion of the mapping information, wherein the processor is configured to:
identify an extension and attribute information of a file and a kind of a request for data included in the file in response to a creation of the request for the data,
set a reference flag in the request for the data when the request for the data is a read request based on the kind of the request and the file is a file used to execute a specific application based on the extension and the attribute information of the file,
identify whether mapping information of a region including a logical address of the data is stored in the first volatile memory in response to the setting the reference flag in the read request,
when the mapping information of the region including the logical address of the data is not stored in the first volatile memory:
set an update flag in the request for the data,
transmit the read request of the data including the logical address to the storage,
transmit a request to update the mapping information of the region including the logical address of the data in the first volatile memory to the storage in response to the setting the reference flag and the update flag in the read request, and
receive the mapping information of the region including the logical address of the data from the storage and store the received mapping information in the first volatile memory, and
when the mapping information of the region including the logical address of the data is stored in the first volatile memory:
identify a physical address mapped onto the logical address of the data through the mapping information of the region including the logical address of the data, and
transmit the read request of the data including the identified physical address to the storage.

2. The electronic device of claim 1, wherein the processor is configured to determine to manage the mapping information of the region including the logical address of the data using the first volatile memory in response to the request for the data is the read request and the reference flag is set in the read request.

3. The electronic device of claim 1, wherein the processor is configured to transmit the update request to the storage in response to the read request of the data is completely processed.

4. The electronic device of claim 1, wherein the processor is configured to transmit the update request to the storage in response to there not being the read request for the data being currently processed.

5. The electronic device of claim 1, wherein the processor is further configured to:
set the reference flag in the request for the data when the request is a write request based on the kind of the request and the file is a file used to execute the specific application based on the extension and attribute information of the file,
transmit the write request of the data including the logical address to the storage, transmit a request to update the mapping information of the region including the logical address of the data in the first volatile memory to the storage in response to the setting the reference flag in the write request, and
update the mapping information of the region including the logical address of the data in the first volatile memory by receiving the mapping information of the region including the logical address of the data from the storage.

6. The electronic device of claim 1, wherein the processor is further configured to:
when the request for the data is a delete request based on the kind of the request, transmit the request to delete the data to the storage.

7. The electronic device of claim 1, wherein the mapping information of the region including the logical address of the data comprises metadata for integrity identification.

8. A method for using a storage of an electronic device, the electronic device comprising first volatile memory and the storage including a nonvolatile memory and a second volatile memory, wherein the nonvolatile memory is configured to store mapping information in which logical addresses and physical addresses for the nonvolatile memory are mapped onto each other, the first volatile memory is configured to store a portion of the mapping information, and the second volatile memory is configured to store a portion of the mapping information, the method comprising:
identifying an extension and attribute information of a file and a kind of a request for data included in the file in response to a creation of the request for the data;
setting a reference flag in the request for the data in response to determining that the request for the data is a read request based on the kind of the request and the file is a file used to execute a specific application identified based on the extension and the attribute information of the file;
identifying whether the mapping information of a region including the logical address of the data is stored in a first volatile memory in response to the setting the reference flag in the read request;
in response to determining that the mapping information of the region including the logical address of the data is not stored in the first volatile memory:
setting an update flag in the request for the data;
transmitting the read request of the data including the logical address to the storage;
transmitting a request to update the mapping information of the region including the logical address of the data in the first volatile memory to the storage in response to the setting the reference flag and the update flag in the read request; and
receiving the mapping information of the region including the logical address of the data from the storage and storing the received mapping information in the first volatile memory; and
in response to determining that the mapping information of the region including the logical address of the data is stored in the first volatile memory:
identifying a physical address mapped onto the logical address of the data through the mapping information of the region including the logical address of the data, and
transmitting the read request of the data including the identified physical address to the storage.

9. The method of claim 8, further comprising:
determining to manage the mapping information of the region including the logical address of the data using the first volatile memory in response to the request for the data is the read request and the reference flag is set in the read request.

10. The method of claim 8, wherein transmitting the update request to the storage includes transmitting the update request to the storage in response to the read request is completely processed.

11. The method of claim 8, wherein transmitting the update request to the storage includes transmitting the update request to the storage in response to there not being the read request for the data being currently processed.

12. The method of claim 8, further comprising:
setting the reference flag in the request for the data when the request is a write request based on the kind of the request and the file is a file used to execute the specific application based on the extension and attribute information of the file;
transmitting the write request of the data including the logical address to the storage;
transmitting a request to update the mapping information of the region including the logical address of the data in the first volatile memory to the storage in response to the setting the reference flag in the write request; and
updating the mapping information of the region including the logical address of the data in the first volatile memory by receiving the mapping information of the region including the logical address of the data from the storage.

13. The method of claim 8, further comprising:
when the request for the data is a delete request based on the kind of the request, transmitting the request to delete the data to the storage.

14. The method of claim 8, wherein the mapping information of the region including the logical address of the data comprises metadata for integrity identification.

* * * * *